United States Patent [19]

(12) United States Patent
Kennedy et al.

(10) Patent No.: US 9,233,375 B2
(45) Date of Patent: Jan. 12, 2016

(54) WOOD CHIPPER, CONTROL SYSTEM THEREFOR, AND METHOD THEREOF

(76) Inventors: Richard S. Kennedy, Mt. Pleasant, MI (US); Scott R. Parks, Remus, MI (US)

(*) Notice: Subject to any disclaimer, the term of this patent is extended or adjusted under 35 U.S.C. 154(b) by 575 days.

(21) Appl. No.: 13/434,221

(22) Filed: Mar. 29, 2012

(65) Prior Publication Data

US 2013/0026266 A1    Jan. 31, 2013

Related U.S. Application Data

(60) Provisional application No. 61/468,680, filed on Mar. 29, 2011.

(51) Int. Cl.
*B02C 25/00* (2006.01)
*B02C 18/22* (2006.01)
*B02C 18/00* (2006.01)

(52) U.S. Cl.
CPC ............. *B02C 18/2225* (2013.01); *B02C 18/00* (2013.01); *B02C 25/00* (2013.01)

(58) Field of Classification Search
CPC ...... B02C 25/00; B02C 18/00; B02C 18/168; B02C 18/2283; B02C 18/2291; B02C 23/04; B02C 2201/066; B02C 18/2225
USPC ............................................. 241/28, 36, 37.5
See application file for complete search history.

(56) References Cited

U.S. PATENT DOCUMENTS

| | | |
|---|---|---|
| 104,548 A | 6/1870 | Brady |
| 1,311,469 A | 7/1919 | Smith |
| 1,409,368 A | 3/1922 | Dudley |
| 1,874,007 A | 8/1932 | Heaton |
| 1,987,688 A | 1/1935 | Lamb |
| 2,131,402 A | 9/1938 | King |
| 2,428,085 A | 9/1947 | Largen |
| 2,487,305 A | 11/1949 | Bridegroom |
| 2,542,952 A | 2/1951 | White |
| 3,029,848 A | 4/1962 | Bombardier |
| 3,077,338 A | 2/1963 | Bergerson et al. |

(Continued)

FOREIGN PATENT DOCUMENTS

| | | |
|---|---|---|
| AU | 4574502 | 12/2002 |
| AU | 763881 | 7/2003 |

(Continued)

OTHER PUBLICATIONS

U.S. Appl. No. 11/796,074, filed Apr. 26, 2007, Holmes.

(Continued)

*Primary Examiner* — Faye Francis
(74) *Attorney, Agent, or Firm* — Paparella & Associates, PC; Joseph A. Paparella

(57) ABSTRACT

A wood chipper includes a frame, an infeed system, a rotatable cutting system, and at least one feed wheel disposed between the infeed system and the cutting system to feed wood material to the cutting system. The wood chipper also includes a winch which includes a winch line having a first end, and a collar disposed adjacent the first end of the winch line. The wood chipper further includes a detector adapted to detect a first and a second position of the winch line, wherein the detector is adapted to allow operation of the at least one feed wheel and prohibit operation of the winch when the first position of the winch line is detected, and to allow operation of the winch and allow operation of the at least one feed wheel in a predefined manner when the second position is detected.

11 Claims, 25 Drawing Sheets

(56) References Cited

U.S. PATENT DOCUMENTS

| | | |
|---|---|---|
| 3,092,273 A | 6/1963 | Schramm |
| 3,216,520 A | 11/1965 | Blonsky |
| 3,275,046 A | 9/1966 | Moyers et al. |
| 3,281,119 A | 10/1966 | Westfall |
| 3,282,450 A | 11/1966 | Atcheson |
| 3,340,912 A | 9/1967 | Williams et al. |
| 3,424,326 A | 1/1969 | Thatcher |
| 3,457,975 A | 7/1969 | Wehr et al. |
| 3,515,185 A | 6/1970 | Wehr et al. |
| 3,559,898 A | 2/1971 | Rinke |
| 3,595,161 A | 7/1971 | Webb |
| 3,630,243 A | 12/1971 | Hamilton et al. |
| 3,642,041 A | 2/1972 | Hamilton et al. |
| 3,777,375 A | 12/1973 | Smith |
| 3,841,507 A | 10/1974 | Barwise |
| 3,844,489 A | 10/1974 | Strong |
| 3,945,517 A | 3/1976 | Carley |
| 3,989,198 A | 11/1976 | Blasko |
| 4,076,061 A | 2/1978 | Greeninger |
| 4,102,528 A | 7/1978 | Cripe |
| 4,176,696 A | 12/1979 | Greeninger |
| 4,238,116 A | 12/1980 | Plante et al. |
| 4,315,652 A | 2/1982 | Barwise |
| 4,338,985 A | 7/1982 | Smith et al. |
| 4,365,927 A | 12/1982 | Schenck |
| 4,390,132 A | 6/1983 | Hutson et al. |
| 4,398,581 A | 8/1983 | Aikins et al. |
| 4,529,350 A | 7/1985 | Jones |
| 4,685,495 A | 8/1987 | Freeman |
| 4,805,676 A | 2/1989 | Aikins |
| 4,898,221 A | 2/1990 | Eriksson |
| RE33,233 E | 6/1990 | Freeman |
| 5,010,933 A | 4/1991 | Doyle |
| 5,088,532 A | 2/1992 | Eggers et al. |
| 5,349,999 A | 9/1994 | Peterson et al. |
| 5,362,004 A | 11/1994 | Bateman |
| 5,372,316 A | 12/1994 | Bateman |
| 5,413,286 A | 5/1995 | Bateman |
| 5,692,548 A | 12/1997 | Bouwers et al. |
| 5,692,549 A | 12/1997 | Eggers |
| 5,769,586 A | 6/1998 | Schulte |
| 5,863,003 A | 1/1999 | Smith |
| 5,988,539 A | 11/1999 | Morey |
| 6,000,642 A | 12/1999 | Morey |
| 6,016,855 A | 1/2000 | Morey |
| 6,032,707 A | 3/2000 | Morey et al. |
| 6,036,125 A | 3/2000 | Morey et al. |
| 6,047,912 A | 4/2000 | Smith |
| 6,059,210 A | 5/2000 | Smith |
| 6,076,572 A | 6/2000 | Cook |
| 6,138,932 A | 10/2000 | Moore |
| 6,138,991 A | 10/2000 | Myers, Jr. |
| 6,299,082 B1 | 10/2001 | Smith |
| 6,357,684 B1 | 3/2002 | Morey |
| 6,446,889 B1 | 9/2002 | Moore |
| 6,517,020 B1 | 2/2003 | Smith |
| 6,572,039 B1 | 6/2003 | Kruer et al. |
| 6,591,973 B2 | 7/2003 | Smith |
| 6,722,596 B1 | 4/2004 | Morey |
| 6,729,567 B1 | 5/2004 | Morey |
| 6,804,871 B1 | 10/2004 | Smith |
| 6,814,320 B1 | 11/2004 | Morey et al. |
| 6,830,204 B1 | 12/2004 | Morey |
| 6,845,931 B1 | 1/2005 | Smith |
| 6,955,310 B1 | 10/2005 | Morey |
| 7,007,874 B1 | 3/2006 | Smith |
| 7,011,124 B1 | 3/2006 | Morey |
| 7,011,258 B2 | 3/2006 | O'Halloran et al. |
| 7,040,558 B2 | 5/2006 | Stelter et al. |
| 7,044,409 B2 | 5/2006 | Stelter et al. |
| 7,121,485 B2 | 10/2006 | Smith |
| 7,121,488 B1 | 10/2006 | Marriott et al. |
| 7,163,166 B1 | 1/2007 | Smith |
| 7,384,011 B1 | 6/2008 | Smith |
| 7,562,837 B2 | 7/2009 | Brand et al. |
| 7,726,594 B2 | 6/2010 | Smith |
| 7,819,348 B2 | 10/2010 | Bouwers et al. |
| 2006/0196981 A1 | 9/2006 | Stelter et al. |
| 2007/0001038 A1 | 1/2007 | Bouwers et al. |
| 2007/0034295 A1 | 2/2007 | Chapman |
| 2007/0104560 A1 | 5/2007 | Hall |
| 2011/0062266 A1 | 3/2011 | Smith |

FOREIGN PATENT DOCUMENTS

| | | |
|---|---|---|
| AU | 2009345114 | 11/2010 |
| CA | 2103633 | 3/1994 |
| CA | 2133119 | 4/1995 |
| CA | 2133120 | 4/1995 |
| CA | 2132942 | 3/1996 |
| CA | 2354105 | 3/2002 |
| CA | 2381889 | 12/2002 |
| CA | 2742211 | 11/2010 |
| CA | 2266176 | 12/2010 |
| DE | 3240385 | 5/1984 |
| DE | 4416195 | 11/1994 |
| EP | 1186345 | 3/2002 |
| EP | 1266692 | 12/2002 |
| EP | 1952888 | 8/2008 |
| EP | 09844192.6 | 7/2009 |
| JP | 2002177806 | 6/2002 |
| JP | 2003103193 | 4/2003 |
| SU | 674730 | 7/1979 |
| WO | WO2010/126541 | 11/2010 |

OTHER PUBLICATIONS

U.S. Appl. No. 10/721,622, filed Nov. 25, 2003, Casper.
U.S. Appl. No. 10/992,158, filed Nov. 18, 2004, Morey.
U.S. Appl. No. 07/942,741, filed Sep. 9, 1992, Bateman.
U.S. Appl. No. 07/874,751, filed Apr. 27, 1992, Bateman.
U.S. Appl. No. 13/318,142, filed Oct. 29, 2011, Morey.
U.S. Appl. No. 13/342,466, filed Jan. 3, 2012, Holmes.
Brush Bandit Catalog; Bandit Industries, Inc.; 32 pages (2010).
Four photos of Vermeer Prototype chipper.
Bandit Model 150, 200+ & 250, the 12" Capacity Brush Disc-Style Chippers brochure, Bandit Ind. Inc. 4 pages (Jul. 1995).
Vermeer BC2000 Brush Chipper brochure, Vermeer Mnfg., 4 pages (1999).

*Normal safety devices in operation to prevent undesired operation of chipper 10 (e.g., feed wheel control remains operative as normal)

*Normal safety devices in operation to prevent undesired operation of chipper 10 (e.g., feed wheel control remains operative as normal)

*Normal safety devices in operation to prevent undesired operation of chipper 10 (e.g., feed wheel control remains operative as normal)

*Normal safety devices in operation to prevent undesired operation of chipper 10 (e.g., feed wheel control remains operative as normal)

WOOD CHIPPER, CONTROL SYSTEM THEREFOR, AND METHOD THEREOF

CROSS REFERENCE TO RELATED APPLICATIONS

This application claims the benefit of the filing date of U.S. provisional application Ser. No. 61/468,680 entitled "Wood Chipper, Control System Therefor, and Method Thereof" which was filed on Mar. 29, 2011 and which is incorporated herein by reference in its entirety.

BACKGROUND OF THE INVENTION

The present invention relates to wood and brush chippers, and more specifically to a wood chipper comprising a winch for processing wood such as brush, branches, and the like.

A variety of machines have been developed to recycle, reduce, or otherwise process wood and brush products. Included therein are machines that chip, cut, grind, or otherwise reduce waste (wood) products including, generally, chippers (disk and drum types), hammer mills, hogs, shredders, grinders, and forestry mowers.

These waste processing systems typically include an infeed system and a waste reducing system, wherein the infeed system is used for directing the waste material to the waste reducing system, the waste reducing system being used for reducing the waste material.

For example: wood chippers are used to reduce branches, trees, and other bulk wood products into small wood chips. A typical wood chipper often includes an infeed chute; a feed system which may be adapted for controlling the feed rate of wood products; a wood chipping mechanism or system; a drive system for the feed system and chipping mechanism; and a discharge chute. The infeed chute is typically a funnel-type conduit provided with a wide opening which tapers toward the feed system to converge the bulk wood/waste products toward the chipping mechanism and, through the action of the feed system, the bulk wood products are brought into contact with the chipping mechanism which grinds, flails, cuts, or otherwise reduces the wood and waste products into smaller pieces. The smaller pieces are then typically propelled into the discharge chute where they exit the wood chipper.

It is known to provide a wood chipper for chipping wood such as brush, branches, and the like to produce wood chips. An example of such a wood chipper is disclosed in U.S. Pat. No. 5,988,539 to Morey, the disclosure of which is incorporated herein by reference in its entirety. In this patent, the wood chipper includes an infeed assembly, feed wheel assembly, and a cutting assembly having a rotatable disc with at least one knife or blade for chipping the wood entering the wood chipper and reducing it to wood chips. Typically, the feed wheel assembly includes a stationary lower feed wheel connected to a lower housing and a movable upper feed wheel connected to an upper housing movable relative to the lower housing for allowing wood to enter the cutting assembly. The wood chipper also includes an engine connected to a hydraulic pump, which pumps fluid to drive hydraulic motors to rotate the feed wheels.

Other examples of such wood chippers are disclosed in U.S. Pat. No. 6,032,707 to Morey et al; U.S. Pat. No. 6,036,125 to Morey et al; U.S. Pat. No. 6,016,855 to Morey; U.S. Pat. No. 5,988,539 to Morey; U.S. Pat. No. 6,000,642 to Morey; U.S. Pat. No. 6,722,596 to Morey; U.S. Pat. No. 6,357,684 to Morey; U.S. Pat. No. 6,830,204 to Morey; U.S. Pat. No. 7,121,488 to Marriott et al; U.S. Pat. No. 6,814,320 to Morey et al.; and U.S. Pat. No. 6,955,310 to Morey, all of which are incorporated herein by reference in their entirety.

Additionally, it is known to incorporate a winch and winch line into these wood chippers system in order to assist with the pulling and/or feeding of the various wood products into the feed tray and feed wheel assembly. Generally speaking, the winch assembly is utilized to assist with the positioning and/or feeding the supply of bulk wood products to the wood chipper. This is typically accomplished by extending the winch line to the material to be processed, anchoring the winch line thereto, and then using the winch to position and/or feed the unprocessed wood to the chipper. Although these existing types of chippers have worked well, they suffer from the disadvantage that, inter alia, the winch line may become entangled in the feed wheel assembly if the winch line is extended while the feed wheel assembly is operating. As a result of this, the winch line can accidentally be fed into the feed wheel assembly, and further may be fed into the cutting assembly, thereby causing operational downtime and/or damage to one or more systems and components of the chipper. Therefore, there is a need in the art to provide a novel control for a wood chipper that overcomes the above disadvantages.

Accordingly, a need exists for novel systems and methods which have, among other advantages, the ability to reduce or prevent the winch line from becoming entangled within one or more of the infeed and reducing systems of the wood chipper, and reducing or preventing the winch line from becoming entangled in a manner that is automatic and therefore does not rely on operator intervention. Therefore, a wood chipper that solves the aforementioned disadvantages and having the aforementioned advantages is desired.

SUMMARY OF THE PRESENT INVENTION

The aforementioned drawbacks and disadvantages of these former wood chippers have been identified and a solution is set forth herein by the inventive wood chipper which includes a frame; an infeed system; a cutting system spaced from the infeed system; at least one feed wheel disposed between the infeed system and the cutting system to feed wood material to the cutting system; a winch operatively attached to the frame; a winch line operatively attached to the winch and comprising a first end; and a detector adapted to detect a first and a second position of the winch line, wherein the detector is adapted to allow operation of the at least one feed wheel and prohibit operation of the winch when the first position of the winch line is detected, and to allow operation of the winch and allow operation of the at least one feed wheel in a predefined manner when the second position is detected. This embodiment may further include, wherein: the predefined manner comprises preventing the operation of the at least one feed wheel and may further include preventing the operation of the cutting system; the predefined manner comprises operating the at least one feed wheel in a reverse direction, and may further include preventing the operation of the cutting system; the detector is disposed adjacent an operational path of the winch line; the detector is disposed adjacent an end of a boom, the boom enclosing a portion of the winch line; the winch line is enclosed when in the first position; a portion of the winch line from a proximate end to a distal end is enclosed when in the first position; the detector is disposed forwardly of an infeed chute; a probe disposed adjacent the first end of the winch line; the detector operatively disposed adjacent the winch line in order to detect the probe, and may further include when the probe and detector are adjacent, the winch line is in the first position, and when the probe and the detector are not adjacent, the winch line is in the second position, or the winch line comprises an end loop disposed adjacent the first end and the probe is disposed rearwardly of the end loop; the detector is a sensor adapted to sense when the winch line is in the first and second position, and further the sensor is a positional sensor adapted to sense the position of the winch line, and yet further, a band disposed adjacent the first end of the winch line, the band adapted to define the first and second position of the winch line, or the sensor is operatively disposed adjacent the winch line in order to sense the band, and further the sensor is operatively disposed adjacent the winch line in order to detect the band; wherein when the band and detector are adjacent, the winch line is in the first position, and when the probe and the detector are not adjacent, the winch line is in the second position; a collar disposed adjacent the first end of the winch line; and wherein the detector is a switch comprising a first and a second position, the first position allowing operation of the at least one feed wheel and prohibiting operation of the winch, the second position allowing operation of the winch and allowing operation of the at least one feed wheel in the predefined manner, the switch operatively attached to the frame such that the collar is adapted to move the switch to the first position when the winch line is in a retracted position and releases the switch to the second position when the winch line moved from the retracted position, and further the switch is a momentary switch normally biased to the second position, and yet further, the collar is positionable along the winch line. Still further yet, the sensor may comprise a magnetic pick-up, the detector may be disposed adjacent an operational path of the winch line, the detector may be disposed forwardly of the housing, the winch line may be substantially enclosed within an extended housing when in a stored position, and the winch line may comprise and end loop and the probe is disposed aft of the end loop. Still further, alternate embodiments may comprise a boom for enclosing the winch line in an operational configuration, the boom extending from the winch, the boom comprising a guide portion disposed at a distal end thereof, and-the switch is disposed on the distal end of the boom, and yet further wherein the infeed assembly comprises an infeed chute and the boom is disposed on the infeed chute, and yet further, a distal end of the boom extends over an infeed tray.

Another aspect of the present invention includes a wood chipper comprising: a frame; an infeed assembly operatively attached to the frame; a rotatable cutting assembly spaced from the infeed assembly; at least one feed wheel disposed between the infeed assembly and the cutting assembly to feed wood material to the cutting assembly; a winch operatively attached to the frame; a winch line operatively attached to the winch and comprising a first end; a collar disposed adjacent the first end of the winch line; a switch comprising a first and a second position, the first position allowing operation of the at least one feed wheel and prohibiting operation of the winch, the second position allowing operation of the winch and allowing operation of the at least one feed wheel in a predefined manner; the switch disposed adjacent an operational path of the winch line such that the collar is adapted to move the switch into the first and second positions. The embodiment may further comprise, wherein: the predefined manner comprises preventing the operation of the at least one feed wheel and/or preventing the operation of the cutting system; or the predefined manner comprises operating the at least one feed wheel in a reverse direction and/or preventing the operation of the cutting system. The embodiment may further comprise: a boom for enclosing the winch line the boom comprising a guide portion disposed at a distal end thereof; and the switch is disposed on the distal end of the boom, and further, a housing disposed between said infeed assembly and said rotatable cutting assembly; wherein the boom is disposed on the housing, and the distal end of the boom extends over an infeed tray. The embodiment may further comprise, wherein the winch includes a release for releasing the winch line.

In another aspect of the present invention, a wood chipper comprises: a frame; an infeed assembly operatively attached to the frame; a rotatable cutting assembly spaced from said infeed assembly and operatively attached to the frame; at least one feed wheel operatively attached to the frame disposed between said infeed assembly and said cutting assembly to feed wood material to said cutting assembly; a housing disposed between said infeed assembly and said rotatable cutting assembly; a winch operatively attached to the housing; a winch line comprising a proximate end operatively attached to the winch, and a distal end opposite thereto and operatively attached to the winch; a collar disposed adjacent the distal end of the winch line; a boom adapted to enclose the winch line in an operational configuration, the boom comprising a distal end; a switch comprising a first retracted and an second extended position, the switch normally biased to the extended position, the retracted position allowing operation of the at least one feed wheel and prohibiting operation of the winch, the extended position allowing operation of the winch and allowing operation of the at least one feed wheel in one of a reverse or non-operational condition; the switch operatively attached to the distal end of the boom such that the collar is adapted to actuate the switch to the retracted position when the winch line is in a fully retracted position and adapted to release the switch to the extended position when the winch line is moved from the retracted position.

And still in another aspect of the present invention, a control for a wood chipper having a powered cutting system, a powered feed system, and a winch comprises: a collar adapted to be disposed on a winch line of a winch; a switch comprising a first and a second position, the switch adapted to be disposed along an operational path of the winch line; wherein the collar is adapted to move the switch from the first and second positions; a control system in communication with the switch and adapted to be operatively connected to the winch and a powered feed system, whereby when the switch is in the first position, the controller allows operation of the powered feed system and prohibits operation of the winch, and when the switch is in the second position, the controller allows operation of the winch and allows operation of the powered feed system in a predefined manner. The embodiment may further comprise, wherein: the predefined manner comprises preventing the operation of the at least one feed wheel, or the predefined manner comprises operating the at least one feed wheel in a reverse direction.

Another aspect of the present invention includes a method of controlling a wood chipper having a powered cutting system, a powered feed system, and a winch comprising: providing a detector adapted to detect a first and a second position of a winch line; detecting the first and the second position of the winch line; allowing operation of at least one feed wheel and prohibit operation of the winch when the first position of the winch line is detected, and to allow operation of the winch and allow operation of the at least one feed wheel in a predefined manner when the second position is detected; extending the winch line, thereby moving the winch line to the second position; detecting the second position of the winch line; powering the winch; using the winch to pull unprocessed wood products to the wood chipper; retracting the winch line, thereby moving the winch line to the first position; detecting the first position; removing power from the winch; and operating the wood chipper to process the wood products. This embodiment may further include: the predefined manner comprises preventing the operation of the at least one feed wheel or the predefined manner comprises operating the at least one feed wheel in a reverse direction.

In another aspect of the present invention, a method of controlling a wood chipper having a powered cutting system, a powered feed system, and a winch comprising: providing a switch adapted to switch between a first and a second position, the switch adapted to be disposed along an operational path of a winch line of a winch; providing a collar adapted to be disposed on the winch line, wherein the collar is adapted to move the switch from the first and second positions; whereby when the switch is in the first position, the controller allows operation of the powered feed system and prohibits operation of the winch, and when the switch is in the second position, the controller allows operation of the winch and allows operation of the powered feed system in one of a reverse or non-operational condition; extending the winch line, thereby moving the collar attached thereto, the collar releasing the switch to the second position; using the winch to pull unprocessed wood products to the wood chipper; retracting the winch line, thereby moving the collar attached thereto, the collar moving the switch to the first position; and operating the wood chipper to process the wood products. This embodiment may further include providing a control system in communication with the switch, the control system adapted to be operatively connected to the winch and a powered feed system for control thereof.

And still in another aspect of the present invention, a wood chipper comprising: a power source; an infeed system; a cutting system spaced from the infeed system; at least one feed wheel disposed between the infeed system and the cutting system to feed wood material to the cutting system; a winch including a winch line; a detector adapted to detect a first and a second load on one or more of the power source, the infeed system, and the cutting system, wherein the detector is adapted to allow operation of the at least one feed wheel and prohibit operation of the winch when the first load is detected, and to allow operation of the winch and allow operation of the at least one feed wheel in a predefined manner when the second load is detected. And, may further include: the predefined manner comprising preventing the operation of the at least one feed wheel, or the predefined manner comprises operating the at least one feed wheel in a reverse direction.

And yet still in another aspect of the present invention, a wood chipper comprises: an engine; an infeed system; a cutting system spaced from the infeed system; at least one feed wheel disposed between the infeed system and the cutting system to feed wood material to the cutting system; a winch; and a detector adapted to detect a first and a second speed of the engine, wherein the detector is adapted to allow operation of the at least one feed wheel and prohibit operation of the winch when the first speed of the engine is detected, and to allow operation of the winch and allow operation of the at least one feed wheel in a predefined manner when the second speed of the engine is detected, wherein further, the predefined manner comprises preventing the operation of the at least one feed wheel or the predefined manner comprises operating the at least one feed wheel in a reverse direction. And, yet further wherein: the detector is a sensor adapted to sense the speed of the engine and to output a signal thereof; the wood chipper further comprising a control system operatively connected to the sensor, the winch, and the at least one feed wheel, whereby when the engine speed is above a first predefined level, the controller allows operation of the at least one feed wheel and prohibits operation of the winch, and when the speed is below a second predefined level, the controller allows operation of the winch and allows operation of the at least one feed wheel in the predefined manner; a second detector adapted to detect a first and a second position of the winch line, wherein the second detector is adapted to allow operation of the at least one feed wheel and prohibit operation of the winch when the first position of the winch line is detected, and to allow operation of the winch and allow operation of the at least one feed wheel in a predefined manner) when the second position is detected, and yet further may comprise a second detector adapted to detect a first and a second position of the winch line and operatively connected to the control system, wherein the control system is adapted to allow operation of the at least one feed wheel and prohibit operation of the winch when the first position of the winch line is detected and the engine speed is above a first predefined level, and to allow operation of the winch and allow operation of the at least one feed wheel in a predefined manner when the second position of the winch line is detected and the engine speed is below the second predefined level.

In yet another aspect of the present invention, a wood chipper comprises: an engine; an infeed assembly operatively attached to the frame; a rotatable cutting assembly spaced from said infeed assembly and operatively attached to the frame; at least one feed wheel operatively attached to the frame disposed between said infeed assembly and said cutting assembly to feed wood material to said cutting assembly; a housing disposed between said infeed assembly and said rotatable cutting assembly; a winch operatively attached to the housing; a winch line comprising a proximate end operatively attached to the winch, and a distal end opposite thereto and operatively attached to the winch; a boom adapted to enclose the winch line in an operational configuration, the boom comprising a distal end thereof; a sensor adapted to detect a first and a second speed of the engine and output a signal thereof; a second sensor adapted to detect at least a first and a second position of the winch line; and a control system operatively connected to the first and second sensors, the winch, and the at least one feed wheel, whereby when the engine speed is above a first predefined level, and the second sensor detects the second position of the winch line, the controller allows operation of the at least one feed wheel and prohibits operation of the winch, and when the speed is below a second predefined level, and the second sensor detects the first position of the winch line, the controller allows operation of the winch and allows operation of the at least one feed wheel in one of a reverse or non-operational condition.

In another aspect of the present invention, a control for a wood chipper having a power source, a cutting system, a feed system, and a winch, the control comprises: at least one sensor adapted to sense the load on one or more of the power source, the cutting system, and the feed system and to output a signal thereof; a control system operatively connected to the at least one sensor and adapted to be operatively connected to a winch and the feed system, whereby when the load is above a first predefined level, the controller allows operation of at least one feed wheel of the feed system and prohibits operation of a winch, and when the speed is below a second predefined level, the controller allows operation of the winch and allows operation of the at least one feed wheel in a predefined manner. This embodiment may further comprise: the predefined manner comprises preventing the operation of the at least one feed wheel, or the predefined manner comprises operating the at least one feed wheel in a reverse direction, or the load the sensor senses is the speed of the power source, or a second sensor adapted to detect at least a first and a second position of a winch line and operatively connected to the control system, wherein the control system is adapted to allow operation of the at least one feed wheel and prohibit operation of the winch when the first position of the winch line is detected and the engine speed is above a first predefined level, and to allow operation of the winch and allow operation of the at least one feed wheel in a predefined manner when the second position of the winch line is detected and the engine speed is below the second predefined level.

Another aspect of the present invention includes a control for a wood chipper having a powered cutting system, a powered feed system, and a winch, the control comprising: at least one sensor adapted to sense the speed of an engine of a wood chipper and to output a signal thereof; a control system operatively connected to the at least one sensor and adapted to be operatively connected to a winch and a powered feed system, whereby when the engine speed is above a first predefined level, the controller allows operation of at least one feed wheel of the powered feed system and prohibits operation of a winch, and when the speed is below a second predefined level, the controller allows operation of the winch and allows operation of the at least one feed wheel in one of a reverse or non-operational condition.

And yet still in another aspect of the present invention, a method of controlling a wood chipper having an engine, a powered cutting system, a powered feed system, and a powered winch comprises: providing a sensor adapted to sense a first and a second speed of the engine; sensing the first or the second speed of the engine; allowing operation of the feed system and prohibit operation of the winch when the first speed is detected, and allowing operation of the winch and allow operation of the feed system in a predefined manner) when the second speed is detected; placing the engine at or below the second speed; extending the winch line; using the winch to pull unprocessed wood products to the wood chipper; retracting the winch line; placing the engine at or above the first speed; operating the wood chipper to process the wood products, wherein further embodiment may include: the predefined manner comprises preventing the operation of the at least one feed wheel or the predefined manner comprises operating the at least one feed wheel in a reverse direction.

And still in another aspect of the present invention, a method of controlling a winch for a wood chipper having an engine, a powered cutting system, a powered feed system, and a powered winch comprises: determining a first speed of the engine; allowing operation of the feed system and prohibiting operation of the winch when the first speed is determined; determining a second speed of the engine; and allowing operation of the winch and allowing operation of the feed system in a predefined manner when the second speed is determined.

And still in another aspect of the present invention, a method of controlling a winch for a wood chipper having an engine, a powered cutting system, a powered feed system, and a powered winch comprises: determining a first position of a winch line; allowing operation of the feed system and prohibiting operation of the winch when the first position is determined; determining a second position of the winch line; and allowing operation of the winch and allowing operation of the feed system in a predefined manner when the second position is determined, wherein further embodiments may comprise, wherein: the determining step includes determining the first position of the winch line in response solely due to the winch line being retracted and without operator intervention thereof, or the determining step includes determining the first position of the winch line in response to the winch line being retracted within an enclosure, wherein the winch line is essentially enclosed within the enclosure.

In another aspect of the present invention, a wood chipper comprises a frame, an infeed system, and a cutting system spaced from the infeed system. The system also includes at least one feed wheel which is disposed between the infeed system and the cutting system to feed wood material to the cutting system, and a winch operatively attached to the frame and including a winch line operatively attached to the winch and comprising a first end. The system further includes a detector which is adapted to detect a first and a second position of the winch line, wherein the detector is adapted to allow operation of the cutting system and prohibit operation of the winch when the first position of the winch line is detected, and to allow operation of the winch and prohibit operation of the cutting system when the second position is detected.

In yet another aspect of the present invention a wood chipper includes a frame, an infeed assembly operatively attached to the frame, a rotatable cutting assembly spaced from the infeed assembly, at least one feed wheel disposed between the infeed assembly and the cutting assembly to feed wood material to the cutting assembly, and a winch operatively attached to the frame. The winch also includes a winch line operatively attached to the winch and further comprises a first end. A collar is also disposed adjacent the first end of the winch line. Also included is a switch comprising a first and a second position, the first position allowing operation of the cutting system and prohibiting operation of the winch, the second position allowing operation of the winch and prohibiting operation of the cutting system, wherein the switch is disposed adjacent an operational path of the winch line such that the collar is adapted to move the switch into the first and second positions.

In still another aspect of the present invention a wood chipper comprises a frame, an infeed assembly operatively attached to the frame, and a rotatable cutting assembly spaced from said infeed assembly and operatively attached to the frame. The system further includes at least one feed wheel operatively attached to the frame which is disposed between said infeed assembly and said cutting assembly to feed wood material to said cutting assembly. Also included is a housing disposed between said infeed assembly and said rotatable cutting assembly, and a winch operatively attached to the housing and including a winch line comprising a proximate end operatively attached to the winch, and a distal end opposite thereto and operatively attached to the winch. The system further includes a collar disposed adjacent the distal end of the winch line, a boom adapted to enclose the winch line in an operational configuration, the boom comprising a distal end, and a switch comprising a retracted and an extended position, the switch normally biased to the extended position, the retracted position allowing operation of the cutting system and prohibiting operation of the winch, the extended position allowing operation of the winch and prohibiting operation of the cutting system. Further, the switch is operatively attached to the distal end of the boom such that the collar is adapted to actuate the switch to the retracted position when the winch line is in a retracted position and adapted to release the switch to the extended position when the winch line is moved from the retracted position.

In yet still another aspect of the present invention a control for a wood chipper having a powered cutting system, a powered feed system, and a winch includes a collar adapted to be disposed on a winch line of a winch, and a switch comprising a first and a second position, the switch adapted to be disposed along an operational path of the winch line. Further, the collar is adapted to move the switch from the first and second positions. The control further includes a control system in communication with the switch and adapted to be operatively connected to the winch and a powered cutting system, whereby when the switch is in the first position, the controller allows operation of the cutting system and prohibits operation of the winch, and when the switch is in the second position, the controller allows operation of the winch and prohibits operation of the cutting system.

In another aspect of the present invention a method of controlling a wood chipper having a powered cutting system, a powered feed system, and a winch is disclosed and includes: providing a detector adapted to detect a first and a second position of a winch line; detecting the first and the second position of the winch line; allowing operation of the cutting system and prohibiting operation of the winch when the first position of the winch line is detected, and to allow operation of the winch and prohibit operation of the cutting system when the second position is detected; extending the winch line, thereby moving the winch line to the second position; detecting the second position of the winch line; powering the winch; using the winch to pull unprocessed wood products to the wood chipper; retracting the winch line, thereby moving the winch line to the first position; detecting the first position; removing power from the winch; and operating the wood chipper to process the wood products.

In yet another aspect of the present invention a method of controlling a wood chipper having a powered cutting system, a powered feed system, and a winch comprises: providing a switch adapted to switch between a first and a second position, the switch adapted to be disposed along an operational path of a winch line of a winch; providing a collar adapted to be disposed on the winch line, wherein the collar is adapted to move the switch from the first and second positions; whereby when the switch is in the first position, the controller allows operation of the cutting system and prohibits operation of the winch, and when the switch is in the second position, the controller allows operation of the winch and prohibits operation of the cutting system; extending the winch line, thereby moving the collar attached thereto, the collar releasing the switch to the second position; using the winch to pull unprocessed wood products to the wood chipper; retracting the winch line, thereby moving the collar attached thereto, the collar moving the switch to the first position; and operating the wood chipper to process the wood products.

In still another aspect of the present invention a wood chipper includes: a power source; an infeed system; a cutting system spaced from the infeed system; at least one feed wheel disposed between the infeed system and the cutting system to feed wood material to the cutting system; a winch including a winch line; and a detector adapted to detect a first and a second load on one or more of the power source, the infeed system, and the cutting system, wherein the detector is adapted to allow operation of the cutting system and prohibit operation of the winch when the first load is detected, and to allow operation of the winch and prohibit operation of the cutting system when the second load is detected.

In yet still another aspect of the present invention a wood chipper includes: an engine; an infeed system; a cutting system spaced from the infeed system; at least one feed wheel disposed between the infeed system and the cutting system to feed wood material to the cutting system; and a winch. Also included is a detector adapted to detect a first and a second speed of the engine, wherein the detector is adapted to allow operation of the cutting system and prohibit operation of the winch when the first speed of the engine is detected, and to allow operation of the winch and prohibit operation of the cutting system when the second speed of the engine is detected.

In another aspect of the present invention a wood chipper comprises: an engine; an infeed assembly operatively attached to the frame; a rotatable cutting assembly spaced from said infeed assembly and operatively attached to the frame; and at least one feed wheel operatively attached to the frame disposed between said infeed assembly and said cutting assembly to feed wood material to said cutting assembly. Also included is a housing disposed between said infeed assembly and said rotatable cutting assembly. Further included is a winch operatively attached to the housing, the winch including a winch line comprising a proximate end operatively attached to the winch, and a distal end opposite thereto and operatively attached to the winch. The chipper further includes a boom adapted to enclose the winch line in an operational configuration, the boom comprising a distal end thereof. Further, a sensor is provided which is adapted to detect a first and a second speed of the engine and output a signal thereof, and a second sensor is also provided which is adapted to detect at least a first and a second position of the winch line. The chipper further includes a control system operatively connected to the first and second sensors, the winch, and the cutting system, whereby when the engine speed is above a first predefined level, and the second sensor detects the second position of the winch line, the controller allows operation of the cutting system and prohibits operation of the winch, and when the speed is below a second predefined level, and the second sensor detects the first position of the winch line, the controller allows operation of the winch and prohibits operation of the cutting system.

In still another aspect of the present invention a control for a wood chipper having a power source, a cutting system, a feed system and a winch includes at least one sensor adapted to sense the load on one or more of the power source, the cutting system, and the feed system and to output a signal thereof. A control system is also included which is operatively connected to the at least one sensor and adapted to be operatively connected to a winch and the cutting system, whereby when the load is above a first predefined level, the controller allows operation of the cutting system and prohibits operation of a winch, and when the speed is below a second predefined level, the controller allows operation of the winch and prohibits operation of the cutting system.

In yet another aspect of the present invention a method of controlling a wood chipper having an engine, a powered cutting system, a powered feed system, and a powered winch includes: providing a sensor adapted to sense a first and a second speed of the engine; sensing the first or the second speed of the engine; allowing operation of the cutting system and prohibiting operation of the winch when the first speed is detected, and allowing operation of the winch and prohibiting operation of the cutting system when the second speed is detected; placing the engine at or below the second speed; extending the winch line; using the winch to pull unprocessed wood products to the wood chipper; retracting the winch line; placing the engine at or above the first speed; and operating the wood chipper to process the wood products.

In another aspect of the present invention a method of controlling a winch for a wood chipper having an engine, a powered cutting system, a powered feed system, and a powered winch comprises: determining a first speed of the engine; allowing operation of the cutting system and prohibiting operation of the winch when the first speed is determined; determining a second speed of the engine; and allowing operation of the winch and prohibiting operation of the cutting system when the second speed is determined.

In yet another aspect of the present invention a method of controlling a winch for a wood chipper having an engine, a powered cutting system, a powered feed system, and a powered winch includes: determining a first position of a winch line; allowing operation of the cutting system and prohibiting operation of the winch when the first position is determined; determining a second position of the winch line; and allowing operation of the winch and prohibiting operation of the cutting system when the second position is determined.

Other objects, advantages, and features of the invention will become apparent upon consideration of the following detailed description and drawings. As such, the above brief descriptions set forth, rather broadly, the more important features of the present novel invention so that the detailed descriptions that follow may be better understood and so that the contributions to the art may be better appreciated. There are of course additional features that will be described hereinafter which will form the subject matter of the claims.

In this respect, before explaining the preferred embodiment of the disclosure in detail, it is to be understood that the disclosure is not limited in its application to the details of the construction and the arrangement set forth in the following description or illustrated in the drawings. To with, the wood chipper of the present disclosure is capable of other embodiments and of being practiced and carried out in various ways. Also, it is to be understood that the phraseology and terminology employed herein are for description and not limitation. Where specific dimensional and material specifications have been included or omitted from the specification or the claims, or both, it is to be understood that the same are not to be incorporated into the claims, unless so claimed.

As such, those skilled in the art will appreciate that the conception upon which this disclosure is based may readily be used as a basis for designing other structures, methods, and systems for carrying out the several purposes of the present invention. It is important therefore that the claims are regarded as including such equivalent constructions, as far as they do not depart from the spirit and scope of the present invention.

Further, the purpose of the Abstract is to enable the United States Patent and Trademark Office, the public generally, and especially the scientists, engineers, and practitioners in the art who are not familiar with the patent or legal terms of phraseology, to learn quickly, from a cursory inspection, the nature of the technical disclosure of the application. Accordingly, the Abstract is intended to define neither the invention nor the application, which is only measured by the claims, nor is it intended to be limiting as to the scope of the invention in any manner.

These and other objects, along with the various features and structures that characterize the invention, are pointed out with particularity in the claims annexed to and forming a part of this disclosure. For a better understanding of the wood chipper of the present disclosure, its advantages, and the specific traits attained by its use, reference should be made to the accompanying drawings and other descriptive matter in which there are illustrated and described the preferred embodiments of the invention.

As such, while embodiments of the wood chipper are herein illustrated and described, it is to be appreciated that various changes, rearrangements, and modifications may be made therein without departing from the scope of the invention as defined by the claims.

BRIEF DESCRIPTION OF THE DRAWINGS

As a compliment to the description and for better understanding of the specification presented herein, 25 pages of drawings are disclosed with an informative, but not limiting, intention.

DETAILED DESCRIPTION OF THE PREFERRED EMBODIMENT

The best mode for carrying out the invention is presented in terms of the preferred embodiment, wherein similar referenced characters designate corresponding features throughout the several figures of the drawings.

Figure 1:
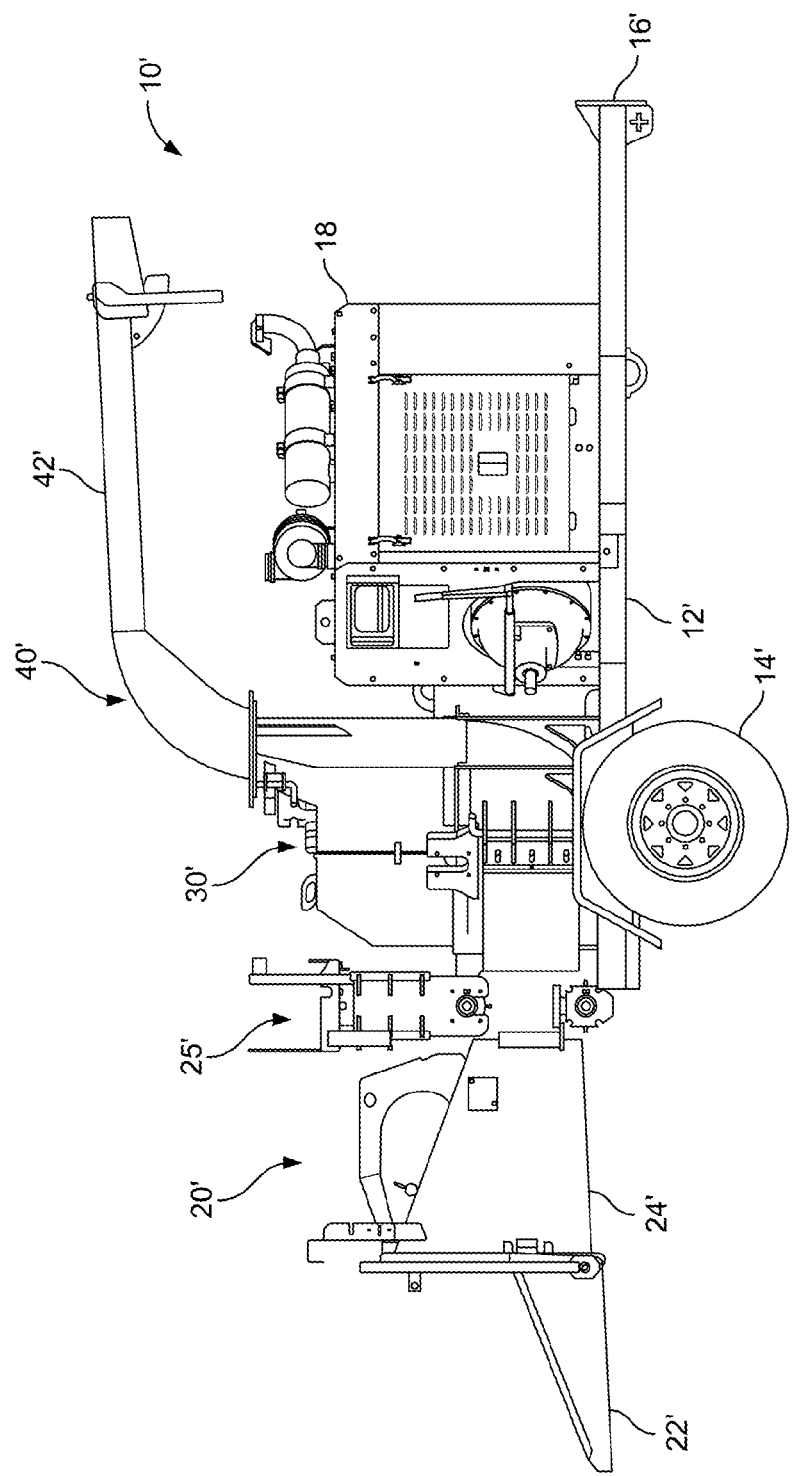
FIG. 1 is a side view of a prior art wood chipper.

For purposes of description herein, the terms "upper", "lower", "right", "left", "rear", "front", "vertical", "horizontal", and derivatives thereof, shall relate to the invention as oriented in FIG. 1. However, it is to be understood that the invention may assume various alternative orientations, except where expressly specified to the contrary. It is also to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Reference will now be made in detail to the present preferred embodiments of the invention, examples of which are illustrated in the accompanying drawings. Wherever possible, these same referenced numerals will be used throughout the drawings to refer to the same or like parts. Like features between the various embodiments utilize similar numerical designations. Where appropriate, the various similar features have been further differentiated by an alphanumeric designation, wherein the corresponding alphabetic designator has been changed. Further, the dimensions illustrated in the drawings (if provided) are included for purposes of example only and are not intended to limit the scope of the present invention. Additionally, particular details in the drawings which are illustrated in hidden or dashed lines are to be considered as forming no part of the present invention.

As used herein, the term wood and wood products are meant to be used and defined in their broad, general, and ordinary sense, and the terminology is meant to include trees, brush, trunks, stems, branches, leaves, or the like, or anything else that could otherwise be recycled, reduced, or otherwise processed, and further includes non-naturally occurring or manufactured wood products such as lumbar, pallets, or other manufactured products that could otherwise be recycled, reduced, or otherwise processed, as is generally known within the art.

As used herein, the term wood chipper is meant to be used and defined in its general and ordinary sense. To with, systems that recycle, reduce, or otherwise process wood products. Included therein are machines that chip, cut, grind, or otherwise reduce wood waste products and include, generally, chippers and/or shredders. Of course, this is not meant to be limiting in any manner and these systems may take on numerous configurations, and may be used for numerous purposes as is generally known within the art.

As described herein above, many of these wood chippers incorporate a winch and winch line into the system in order to assist with the pulling and/or feeding of the various wood products into the feed tray and feed wheel assembly. Generally speaking, the winch assembly is utilized to assist in the positioning and/or feeding of the supply of bulk wood products to the wood chipper. Although these existing types of chippers have worked well, they suffer from the disadvantage that, inter alia, the winch line may become entangled in the feed wheel assembly if the winch line is extended while the feed wheel assembly is operating. As a result of this, the winch line can accidentally be fed into the feed wheel assembly, and further may be fed into the cutting assembly, thereby causing operational downtime and/or damage to one or more systems and components of the chipper. Therefore, there is a need in the art to provide a novel control for a wood chipper that overcomes the above disadvantages.

Accordingly, a need exists for novel systems and methods which have, among other advantages, the ability to reduce or prevent the winch line from becoming entangled within one or more of the infeed and reducing systems of the wood chipper, as well as doing so in a manner that is automatic and therefore does not rely on operator intervention. Therefore, a control system that solves the aforementioned disadvantages and having the aforementioned advantages is desired and, disclosed herein. Accordingly, a need exists for control systems and methods that are, among other things: easily operable; result in increase productivity; reduce machine downtime and repairs; as well as are cost effective.

While not meant to be limiting in any manner, it is envisioned that the disclosed wood chipper, control system, and methods thereof may offer the following advantages: The control system may be designed to interact with, cooperate with, or control one or more systems of the wood chipper, whether existing or developed in future. For example, in one embodiment, the invention may be configured to allow for the operation of the chipper in such a manner that when the winch line of the present invention is in a first state (e.g., retracted), the operation of the feed wheels is allowed, while the operation of the winch is prohibited. However, when the winch line of the present invention is in a second state (e.g., extended), the operation of the winch is allowed, while the operation of the feed wheels may be either prohibited or allowed to operate only in reverse. As such, entanglement of the winch line during operation of the wood chipper can be prevented. Further, the inventive control system is design to work automatically and in conjunction with the winch line. As such, no additional operator intervention is required.

In another embodiment, the invention may be configured to allow for the operation of the chipper in such a manner that when the engine speed (or other load determining factor) of the chipper is at or above a predetermined operational threshold, for example the speed of the engine required to normally process wood products, the operation of the feed wheels is allowed, while the operation of the winch is prohibited. However, when the engine speed of the chipper is at or below a predetermined threshold, for example when the speed of the engine is below the speed required to normally process wood products (e.g., at idle), the operation of the winch is allowed, while the operation of the feed wheels may be either prohibited or allowed to operate only in reverse. As such, entanglement of the winch line during operation of the wood chipper can be prevented. Further, the inventive control system is design to work automatically and in conjunction with the engine speed and as such, no additional operator intervention is required.

Further, in one embodiment the inventive systems and methods utilize relatively simple mechanical and electrical devices in its operation and therefore, may be more reliable than complex devices. For example, the system may be actuated via a switch which is operatively connected to a mechanical valve disposed within the hydraulics of a feed system in order to make inoperable, and/or reverse the feed system; In another embodiment, the system is configured so as to require the winch line to be disposed in a predefined condition or manner for operation of the feed wheels of the wood chipper and therefore, the system does not allow operation of the feed wheels when the winch line is not in its proper state; In another embodiment, the system is configured so as to require the winch line to be in a predetermined state (i.e., a first state) for normal operation of the wood chipper. Otherwise, the wood chipper will not operate as normal.

In another embodiment, the system is configured so as to require the engine speed (or other load determining characteristic) of the wood chipper to be at or above a predefined level or condition for operation of the feed wheels of the wood chipper and therefore, the systems and methods do not allow operation of the feed wheels when the engine speed is not at its predefined level; In another embodiment, the system is configured so as to require the engine speed of the wood chipper to be at or above a predetermined state (i.e., a first state) for normal operation of the wood chipper. Otherwise, the wood chipper will not operate as normal;

In another embodiment, the system is configured so as to require the engine speed (or other load determining characteristic) of the wood chipper to be at or above a predefined level or condition in order to allow the feed wheels to be operated, and while at this condition, the winch is inoperable. Alternatively, when the wood chipper is below the predefined level, the winch is allowed to operate, while the feed wheels are either made inoperable, or operate in reverse.

In another embodiment, the systems and methods are designed to be automatically actuated by the winch line upon reaching a refracted state; In another embodiment, the system is designed to be automatically actuated by the load of the engine; In another embodiment, the control system is designed to be used as a feed control and in yet another embodiment, the control system is designed to be used as a winch control.

As such, the control system may be utilized as a feed and/or winch control, either in conjunction with existing feed and winch controls, or exclusive thereto. For example, the wood chipper, control system, and methods thereof may be utilized to make inoperable, stop, or reverse the feed wheels of the wood chipper, while allowing operation of the winch, when in a second state, thereby reducing or preventing the winch line from becoming entangled within the wood chipper. Again, and for example only, in one embodiment the operator may: remove the winch line from its retracted or stored position, thereby automatically making inoperable, stopping, or reversing the feed wheels of the wood chipper while allowing operation of the winch; attach the winch line to the wood or brush that is to be processed; and move the unprocessed wood material to the feed assembly of the wood chipper for processing thereby. Due to the above-defined state of the feed wheels, these actions are now accomplished without the possibility that the winch line will become entangled in one or more of the feed and cutting systems of the chipper. Further, once the winch is returned to its retracted or stored position, the operation of the winch is automatically disabled and the operation of the feed wheels automatically return to its normally operable condition.

As a further example and in another embodiment: the operator may place the engine of the wood chipper below a predefined threshold, thereby automatically making inoperable, stopping, or reversing the feed wheels of the wood chipper while allowing operation of the winch; the operator then removes the winch line from its stored position; attaches the winch line to the wood or brush that is to be processed; and moves the unprocessed wood material to the feed assembly of the wood chipper for processing thereby; the operator then moves the winch line to its stored position and then adjusts the engine of the wood chipper above the predefined threshold, and in one embodiment thereby automatically disables the winch and automatically returns the operation of the feed wheels to its normal operable condition. Further, various features, systems and controls may be utilized to ensure that the winch line is fully retracted. For example only, the control system may be designed to sense the speed of the engine, as well as the position of the winch line in order to ensure the winch line is retracted and the engine is above the predefined level, before operating the feed wheels. Again, due to the above-defined state of the feed wheels, these actions are now accomplished without the possibility that the winch line will become entangled in one or more of the feed and cutting systems of the chipper.

Thus, the present wood chipper, control system, and methods thereof not only prevent the winch line from becoming entangled within the wood chipper, they do so in a manner that is either fully automatic in conjunction with the operation of the winch line, or requires only minor operator intervention (for example, setting the engine speed).

While control systems for winch and feed wheel operation exist, these existing systems are designed to activate only in response to operator input. For example, systems that rely on the operator placing, grabbing, pulling, or otherwise activating a control in order to actuate. However, relying upon operator intervention is problematic and, generally speaking, the more steps the operator is required to perform, the more likely it is that short cuts will be taken and/or be deactivated by the operator. Additionally, these systems rely on the winch cable being exposed in order to operate (i.e., reach) the control. By leaving the winch cable exposed, these systems may be susceptible to deactivation or otherwise rendered inoperable by branches, brush, or the like. Contrarily, the control system of the present invention overcomes these existing problems. For example, with the system as described further herein, the operation of the control is automatic via the positioning of the winch or adjusting the speed of the engine, and the winch line may be, in one embodiment, fully retracted (i.e., shielded) from being exposed when in the stored position.

Referring now to the drawings and to FIG. 1 in particular, a prior art wood chipper is shown generally at 10' and includes a frame 12' supported by a pair of wheels 14', a conventional trailer hitch 16' to allow the chipper to be towed by a vehicle (not shown), and a power source 18'. Supported on frame 12', the wood chipper 10' includes: an infeed assembly or system 20' comprising an infeed tray 22' and an infeed chute 24' to allow wood material to enter the wood chipper; a feed system 25' comprising a feed wheel assembly (not shown), the feed wheel assembly typically comprising at least one feed wheel (not shown) disposed between the infeed system 20' and the cutting system 30' to feed wood material to the cutting system, and one or more feed wheel housings 28'; a cutting assembly or system 30' spaced from the feed system 25' and comprises cutters (not shown) and a cutting assembly housing 34'; and a discharge assembly 40' comprising a discharge chute 42'.

The power source 18' typically comprises an internal combustion engine and provides rotational energy to both the feed wheels (not shown) of the feed system 25' and the cutting disc/drum (not shown) of the cutting system 30'. The engine 18' operatively couples the feed system 25' and cutting system 30' to cause rotation of the feed wheels (not shown) and the rotatable disc/drum (not shown). The engine 18 is typically operated such that the cutting disc/drum (not shown) rotates at a relatively high velocity, while the feed wheels (not shown) rotate relatively slowly. In operation, trees, brush, and other bulk wood products are fed into the infeed chute 24' and captured between, for example, opposed, rotating feed wheels (not shown) of the feed system 25' which feed, pull, or otherwise cause the bulk wood products to encounter the cutting disc/drum (not shown) of the cutting system 30". The cutting system then reduces the bulk wood products into chips which are expelled through discharge chute 42'.

It will be understood that the wood chipper 10 may comprise any suitable waste reducing machinery such as the trailerable wood chipper as seen in FIG. 1 or any other movable or stationary machinery used to chip, grind, cut, or otherwise reduce bulk products. While the preferred embodiment incorporates a pair of opposed, horizontally aligned feed wheels, it is also to be understood that any feed system can be incorporated into the invention. It will be further understood that this application describes the structure and operation of the feed wheels with respect to hydraulic systems, but that the feed wheels may be powered by any other suitable method. Further, while the preferred embodiment incorporates an internal combustion engine, the wood chipper can be powered by any other suitable methods including, but not limited to, electricity, gas, diesel, or a power take-off from an auxiliary power source without departing from the scope of this invention.

Figure 2:
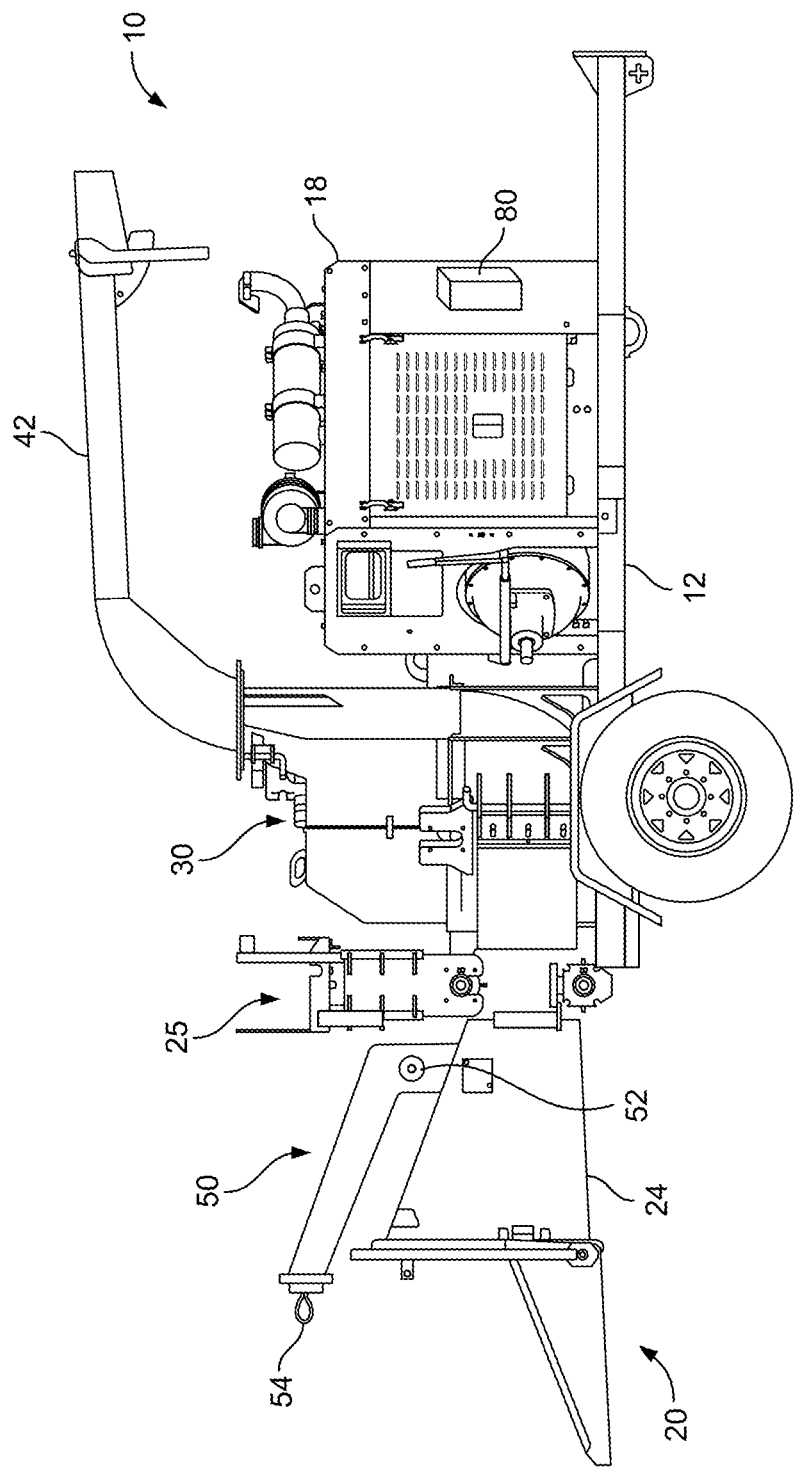
FIG. 2 is a side view of a wood chipper according to one embodiment of the present invention.

The disadvantages and drawbacks of the prior art are overcome through the waste processing system of the present invention, wherein preferred embodiments are disclosed in FIGS. 2-17. Referring now to FIG. 2, one embodiment of a wood chipper is shown generally at 10 and includes a frame 12 supported by a pair of wheels 14, and a trailer hitch 16 in order to allow the waste processing system to be transported by a vehicle. Supported on the frame 12 are an infeed system 20, a feed system 25 spaced therefrom, a cutting system 30 spaced therefrom, and a discharge chute 42. A power system 18, typically comprising an internal combustion engine, is also mounted on frame 12 to provide power to both a feed system 25 and the cutting system 30. Also shown in FIG. 2 is a winch assembly or system 50 which comprises a winch 52 for operating a winch line 54.

In one embodiment (see generally FIGS. 2-3) the wood chipper includes a wood chipper 10 comprising: a frame 12; an infeed system 20 operatively attached to the frame 12 and extending therefrom; a rotatable cutting system 30 spaced from the infeed system 20 and operatively attached to the frame; at least one a feed wheel system 26 (not shown) operatively disposed between the infeed system 20 and the cutting system 30 to feed wood material to the cutting system; a winch 52 operatively attached to the wood chipper 10 and including a winch line 54 operatively attached to the winch and comprising a proximate end 56 operatively attached to the winch and a first or distal end 58; a detector 60 is adapted to detect a first 62 and a second 64 position of the winch line 54, wherein the detector is adapted to allow operation of the at least one feed wheel assembly 26 and prohibit operation of the winch 52 when the first or retracted position of the winch line 54 is detected, and to allow operation of the winch 52 and allow operation of the at least one feed wheel assembly 26 in a predefined manner when the second or extended position is detected.

Figure 3:
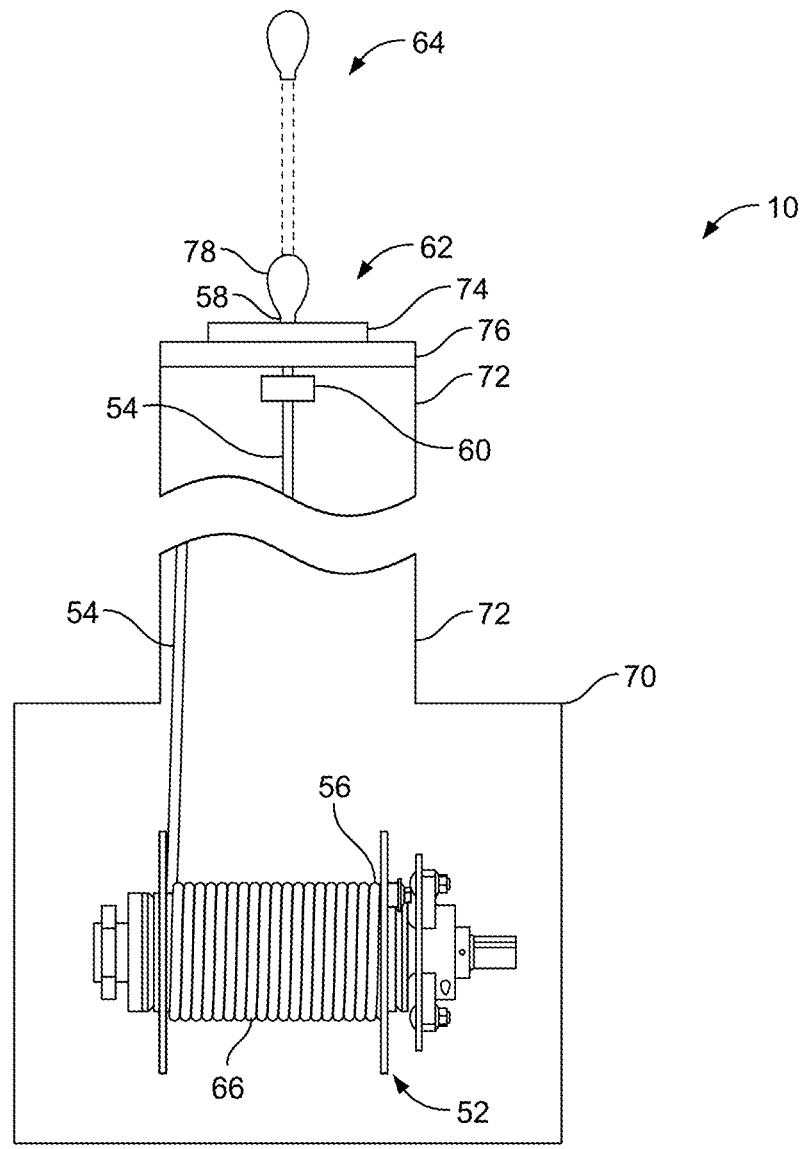
FIG. 3 is a partial sectional top view of the winch system of the wood chipper of FIG. 2.

While the winch 52 and winch line 54 may be operatively connected to wood chipper 10 in any operable configuration, FIGS. 2 and 3 illustrate one embodiment wherein the winch 52 is housed within a winch assembly housing 70 comprising an elongated arm, extension, or boom 72. In this embodiment, the housing 70 is attached to the infeed chute 24. Boom 72 may enclose and support winch line 54 in an operational configuration, and may also comprise a guide portion 74 disposed at a distal end 76 of boom 72 for, inter alia, guiding and supporting winch line 54, as well as extending the winch's operational reach. As winch 52 may be utilized to assist with the loading and placement of bulk wood products into the infeed assembly 20, the distal end 76 of boom 72 may be positioned so as to effectuate optimal loading and positioning. In one embodiment, the distal end 76 of boom 72 terminates over and above the infeed tray 22. Of course, this positioning may be changed as requirements dictate.

Additionally, by enclosing all or a substantial portion of winch line 54 within boom 72, for example when winch line 54 is in its retracted or storage state, the chances of accidentally snagging the winch line 54 in the feed wheels 26 are reduced during operation of the wood chipper 10. In the illustrated embodiment, a substantial portion of winch line 54 is enclosed and only an end portion, for example a loop portion 78, is not enclosed. However, as long as the exposed portion of the winch line 54 is not able to be fed into the feed wheels 26 (e.g., the length of the exposed portion of the winch line 54 from the guide portion 74 to a distal end of loop 78 is shorter than the distance from the guide portion 74 to the feed wheels 26) a substantial portion of winch line 54 would be enclosed.

Winch line 54 includes a proximate end 56 which is connected to winch 52 in any known manner, for example through take up reel 66, and a first or distal end 58. Distal end 58 may be extended and refracted from winch 52, and in this embodiment from boom 72, and is utilized for connection with the unprocessed wood products in order to effectuate loading and positioning. Further, the winch line 54 may also comprise a loop 78 or other end feature, disposed adjacent first end 58, to assist the operator with the connection to the wood products.

Also illustrated in FIG. 3 is detector 60 which is adapted to detect at least the first or retracted position 62 of the winch line 54, and may also detect a second or extended position 64 of the winch line 54. Detector 60 may comprise any known detector which is capable of detecting the first and/or second position of winch line 54, and is operatively connected to the winch 52 and the feed wheel assembly 26 such that once the first position 62 is detected operation of the feed wheel assembly 26 is allowed while operation of the winch 52 is prohibited, and to allow operation of the winch 52 and allow operation of the feed wheel assembly 26 in a predefined manner when either not in the first position or when the second or extended position is detected. In one embodiment, the predefined manner comprises preventing the operation of the feed wheels 26, for example by removing power therefrom, and in another embodiment, the predefined manner comprises operating the feed wheel 26 in a reverse direction (i.e., in a direction that moves the feed material away from the cutting system 30). Additionally, the predefined manner may also include removing power from cutting system 30, as well as powering, controlling, removing power from, or otherwise affecting other operable systems of system 10.

Detector 60 may be operatively connected directly to the winch 52 and/or feed wheels 26 for control thereof. Alternatively, detector 60 may provide a signal to a controller 80 in response to the detection of the first and/or second position of winch line 54, wherein controller 80 is utilized to control the desired operation of the winch 52 and/or feed wheels 26. While detector 60 may be located anywhere within or on chipper 10, in one embodiment the detector is disposed adjacent the operational path of winch line 54, wherein the operational path of the winch line includes the path of the winch line during normal operation of the winch. For example, FIG. 3 illustrates one operational path of winch line 54 comprising the path of the winch line from take up reel 66 within housing 70, through boom 72, to distal end 76 of boom 72. Of course, any operational path of the winch line may be accommodated by placing the detector 60 adjacent thereto. This positioning accommodates the detection of the position of winch line 54. For example, detector 60 may be disposed adjacent the distal end 76 of boom 72. Further, the detector may be disposed forwardly, or in front of infeed chute 24. As such, when winch line 54 is in its retracted state, the end portion 58 of winch line 54 is, among other advantages, easily reachable during the operation of the wood chipper thereby reducing the amount of effort required by the operator for operation thereof.

Figure 4:
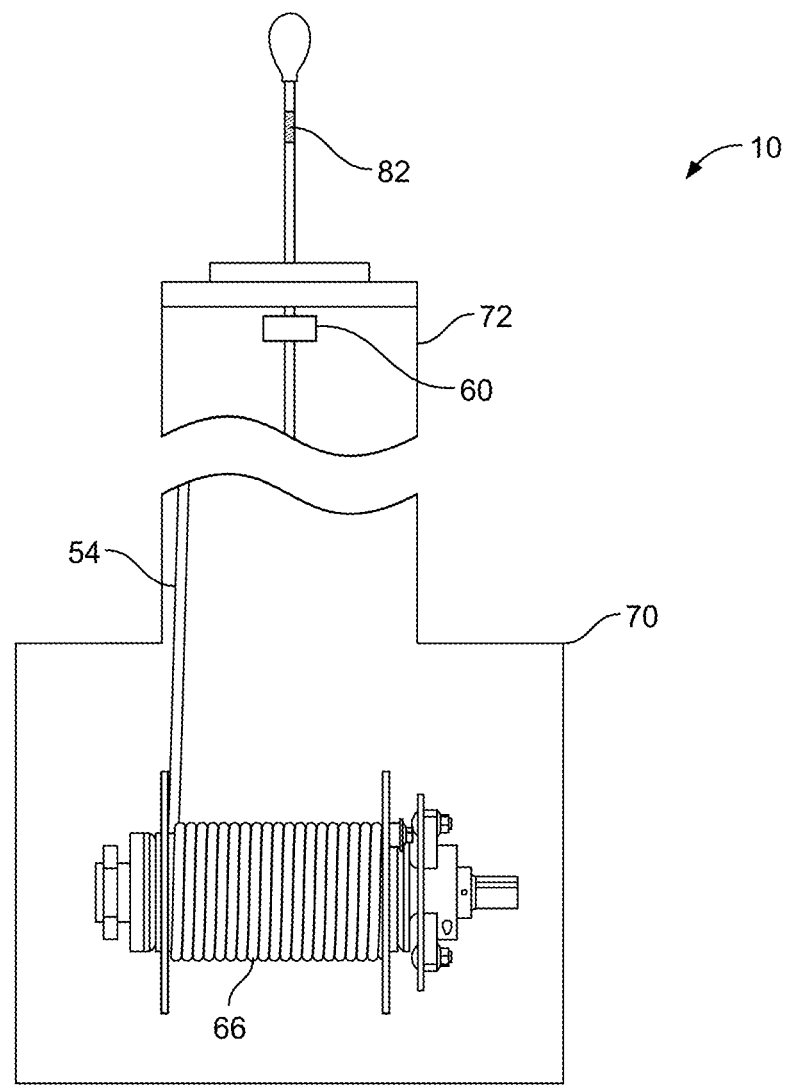
FIG. 4 is a partial sectional top view of another embodiment of the winch system of the wood chipper of FIG. 2.

In a further embodiment illustrated in FIG. 4, the winch line 54 includes a probe, band, or other device 82 which is read or detected by detector 60 in order to ascertain when the winch line 54 is in the first retracted or second extended position. In this embodiment, the probe 82 is positioned on winch line 54 such that the probe 82 defines or demarcates the first retracted or second extended position of winch line 54. For example, when winch line 54 is being refracted and probe 82 is detected by detector 60, the winch line is in its first or retracted position, while when winch line 54 is being extended and probe 82 is not detected, the winch line is in its second or extended position. As illustrated, one embodiment includes a probe 82 disposed adjacent the first end 58 of winch line 54 and the detector 60 operatively disposed adjacent the winch line in order to detect the probe. As such, when the probe 82 is adjacent detector 60, the winch line is in its first or retracted position, while when the probe 82 is not adjacent detector 60, the winch line is in its second or extended position. As such, the probe 82 may be utilized to define the first 62 and second 64 positions of the winch line 54. This embodiment also illustrates a winch line 54 which includes an end loop 78 disposed adjacent the first end 58 of winch line 54, wherein the probe 82 is disposed rearwardly of the end loop 78.

Figure 5:
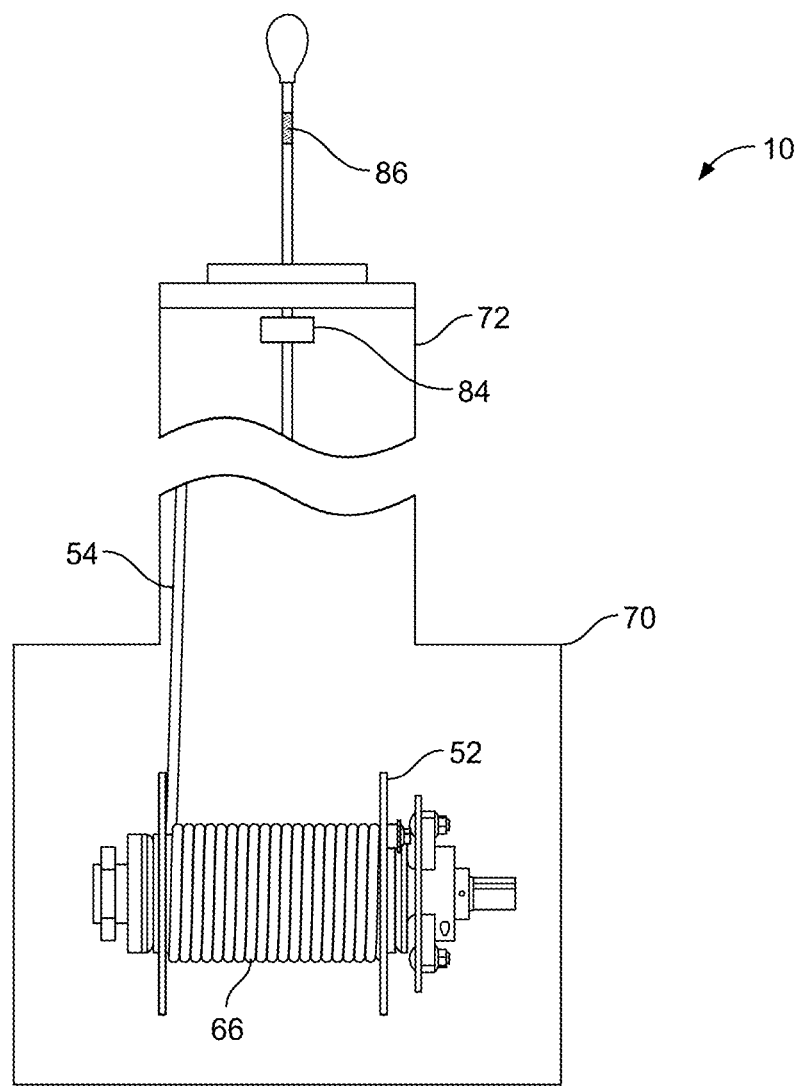
FIG. 5 is a partial sectional top view of yet another embodiment of the winch system of the wood chipper of FIG. 2.

In yet another embodiment as illustrated by FIG. 5, the detector 60 is (or is replaced with) a sensor 84 which is adapted to sense when the winch line 54 is in the first 62 and second 64 position. For example, sensor 84 may comprise a positional sensor adapted to sense the position of the winch line 54.

Sensor 84 may comprise any known sensor which is capable of detecting and/or signaling at least the first 62, and may sense the second 64, position of winch line 54, and is operatively connected to the winch 52 and the feed wheel assembly 26 such that once the first position 62 is detected, operation of the feed wheel assembly 26 is allowed while operation of the winch 52 is prohibited, and to allow operation of the winch 52 and allow operation of the feed wheel assembly 26 in a predefined manner when the second 64 or extended position is detected (or the first position is not detected). Further, sensor 84 may also be used to detect and signal other, variable components of winch line 54. For example, sensor 84 may be used to determine when the first position 62 is near sensor 84, as opposed to solely detecting its presence. In this manner, the operation of winch 52 may be enhanced by, for example only, operating winch 52 at multiple speeds: one (e.g., low) speed for retracting winch line 54 when the first position 62 is near, and another (e.g., high) speed for retracting the winch line 54 when the first position 62 is not near. For example, in the embodiment of FIG. 5, a band 86 is disposed adjacent the first end 58 of the winch line 54 and the sensor 84 is operatively disposed adjacent the winch line 54, for example on the end 76 of boom 72 thereby sensing the band 86, and the corresponding first and second positions. Sensor 84 could then send a signal to controller 80 in accordance thereto and as defined above. Of course, this is not meant to be limiting in any manner and sensor 84 may comprise any sensor whether active or passive, scanning or non-scanning, imaging or non-imaging, and including but not limited to positional sensors and magnetic sensors.

Figure 6:
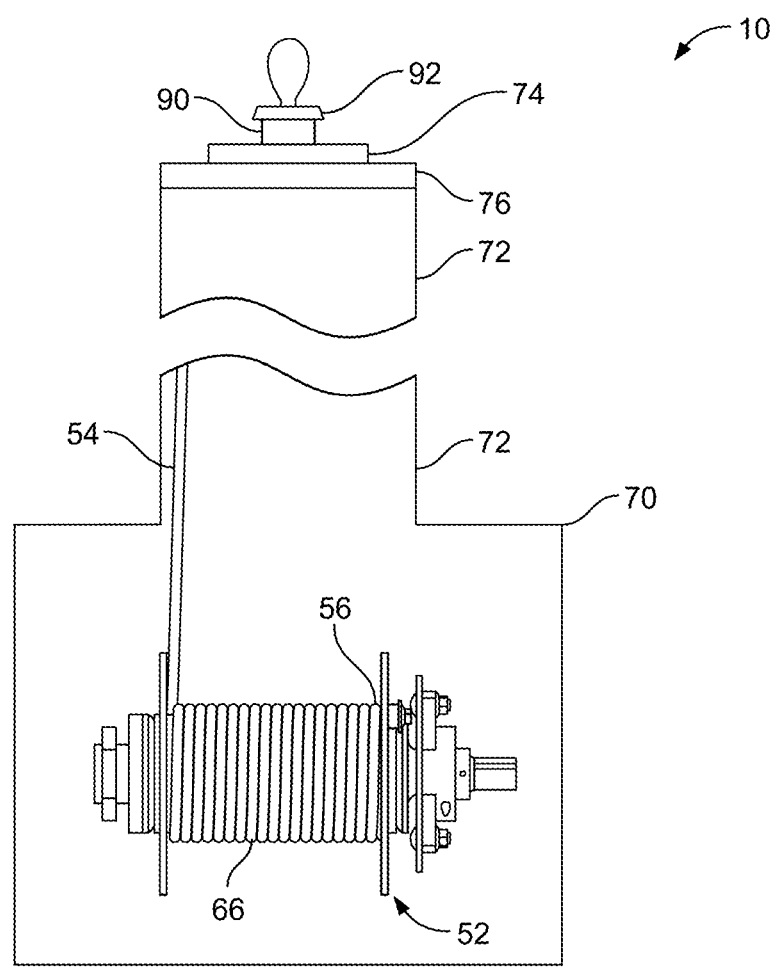
FIG. 6 is a partial sectional top view of still another embodiment of the winch system, in a refracted state, of the wood chipper of FIG. 2.
Figure 7:
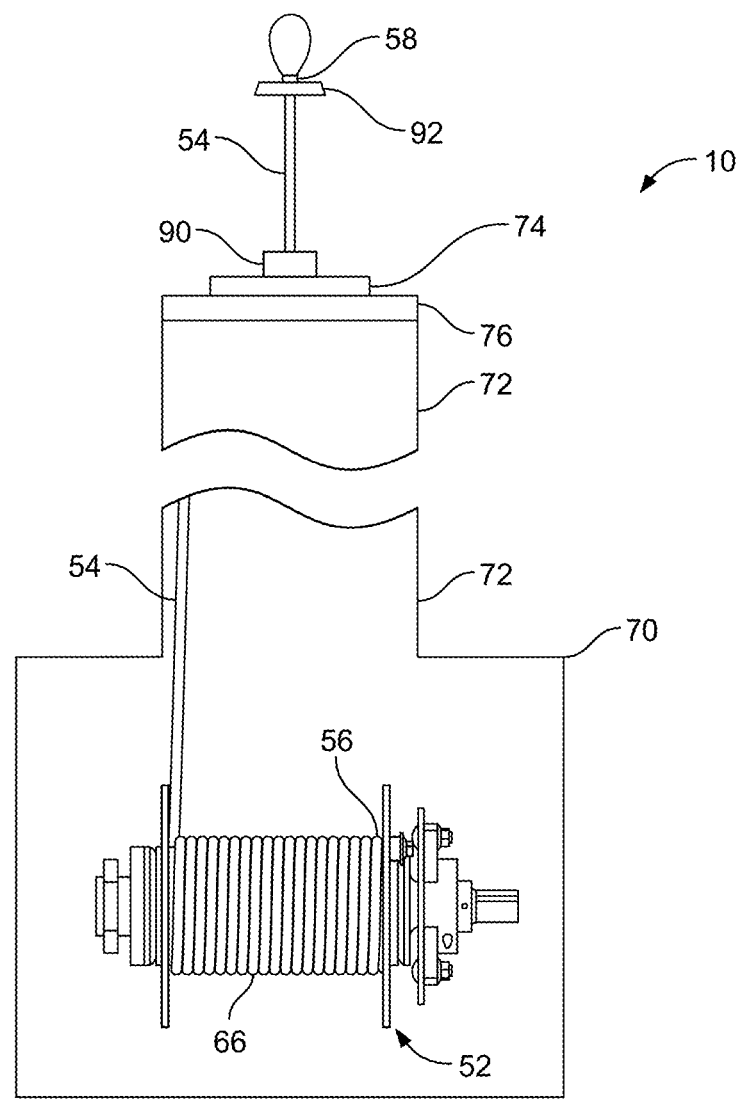
FIG. 7 is a partial sectional top view of the winch system, in an extended state, of the wood chipper of FIG. 6.

FIG. 6 illustrates yet another embodiment wherein the detector 60 is (or is replaced with) a switch 90 for detecting the first or retracted position 62 of winch line 54 (as illustrated by FIG. 6), and the second or extended position 64 of the winch line 54 (as illustrated by FIG. 7). Switch 90 comprises any known switch which is capable of detecting, activating, or switching between a first position (for example only, an active position) and a second position (for example only, an non-active position), these positions corresponding to the first 62 or second 64 position of winch line 54. The switch 90 may also be operatively connected to the winch 52 and the feed wheel assembly 26. For example, operatively connected such that once the first position 62 is detected, operation of the feed wheel assembly 26 is allowed operation of the winch 52 is prohibited, while operation of the winch 52 in allowed and operation of the feed wheel assembly 26 is allowed only in a predefined manner when the second or extended position is detected. In one embodiment, the predefined manner comprises preventing the operation of the feed wheels 26, for example by removing power therefrom, and in another embodiment the preferred manner comprises operating the feed wheel 26 in a reverse direction (i.e., in a direction that moves the feed material away from the cutting system 30.

Switch 90 may be mechanical and operatively connected directly to the winch 52 and/or feed wheels 26 for control thereof. Alternatively, switch 90 may provide a signal to a controller 80 in response thereto wherein controller 80 is utilized to control the desired operation of the winch 52 and/or feed wheels 26. Further, while switch 90 may be located anywhere within or on chipper 10, in one embodiment the switch is disposed adjacent the operational path of winch line 54. For example, switch 90 may be disposed adjacent the distal end 76 of boom 72. Further, the switch may be disposed forwardly, or in front of infeed chute 24. As such, when winch line 54 is in its refracted state, the end portion 58 of winch line 54 is, among other advantages, easily reachable during the operation of the wood chipper thereby reducing the amount of effort required by the operator for operation thereof.

In the embodiment illustrated, the winch line 54 includes a collar, band, or other device 92 mounted or otherwise affixed to winch line 54 which activates (for example only, pushes in), and deactivates (for example only, releases) switch 90 in order to ascertain when the winch line 54 is in the first retracted or second extended position. In this embodiment, the collar 92 is positioned on winch line 54 such that the collar 92 defines or demarcates the first or retracted 62 (FIG. 6) or second extended 64 position (FIG. 7) of winch line 54. For example, when winch line 54 is retracted, collar 92 will activate (e.g., push in) switch 90 and the winch line is in its first or retracted position. However, when winch line 54 is extended, withdrawn, or otherwise moved from the first position, the collar will no longer activate (e.g., release) switch 90 and winch line is in its second or extended position. As illustrated, one embodiment includes a collar 92 disposed adjacent the first end 58 of winch line 54 and the switch 90 is operatively disposed at the distal end 76 of boom 72. As such, when the collar 92 activates switch 90, the winch line is in its first or retracted position, while when the collar 92 is not activating switch 90, the winch line is in its second or extended position. As such, the collar 92 may be utilized to define the first 62 and second 64 positions of the winch line 54. In this particular embodiment, switch 90 comprises a 2-position momentary switch that is normally biased outwardly (e.g., to the second or released position).

Figure 8:
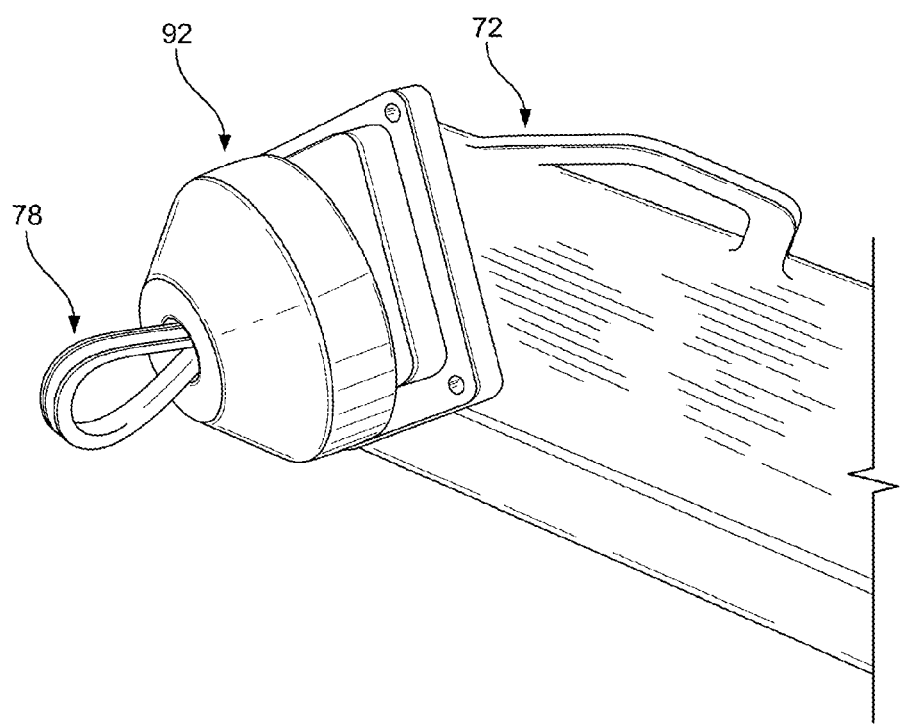
FIG. 8 is a partial perspective view of the winch system of FIG. 6.
Figure 9:
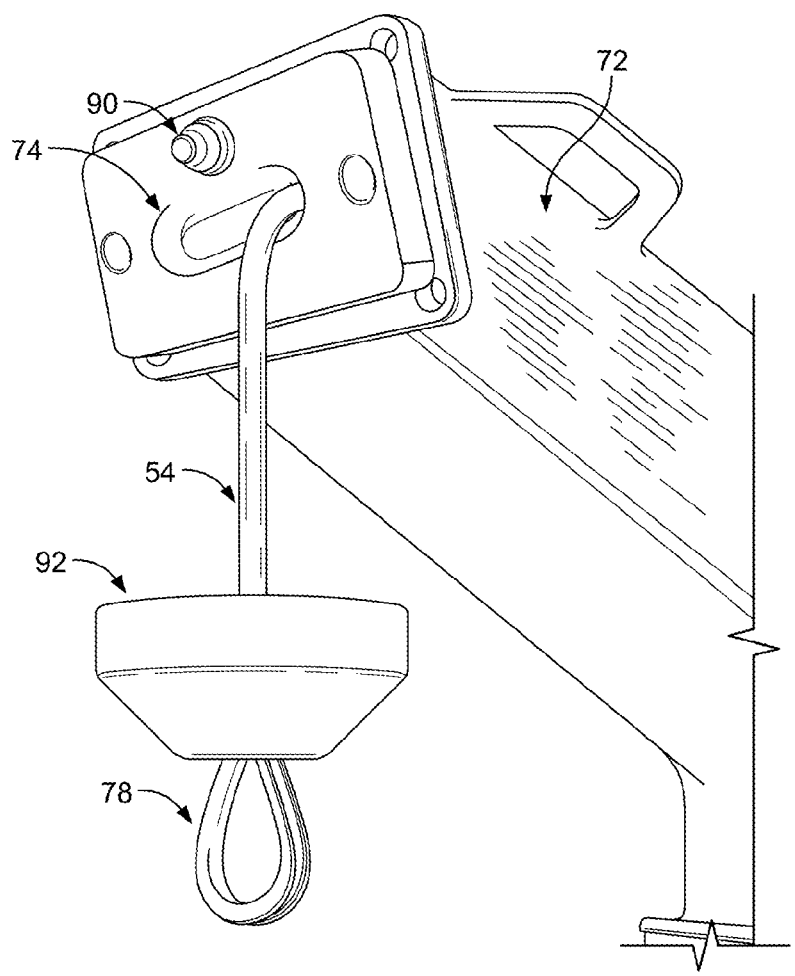
FIG. 9 is a partial perspective view of the winch system of FIG. 7.

As best illustrated by FIG. 8, the collar 92 of this embodiment comprises a circular collar centrally mounted to winch line 54. This embodiment also illustrates a winch line 54 which includes an end loop 78 disposed adjacent the first end 58 of winch line 54, wherein the collar 92 is disposed rearwardly of the end loop 78. Typically the collar 92 will be affixed in a secure (e.g., non-movable) manner along winch line 54. However, the collar can be made to be adjustable along the winch line 54 and then secured in a desired position. FIG. 8 illustrates an exemplary embodiment of the winch line 54 is its first, retracted, or stored position 62, and FIG. 9 illustrates an exemplary embodiment of the winch line 54 is its second or extended position 64.

Figure 10:
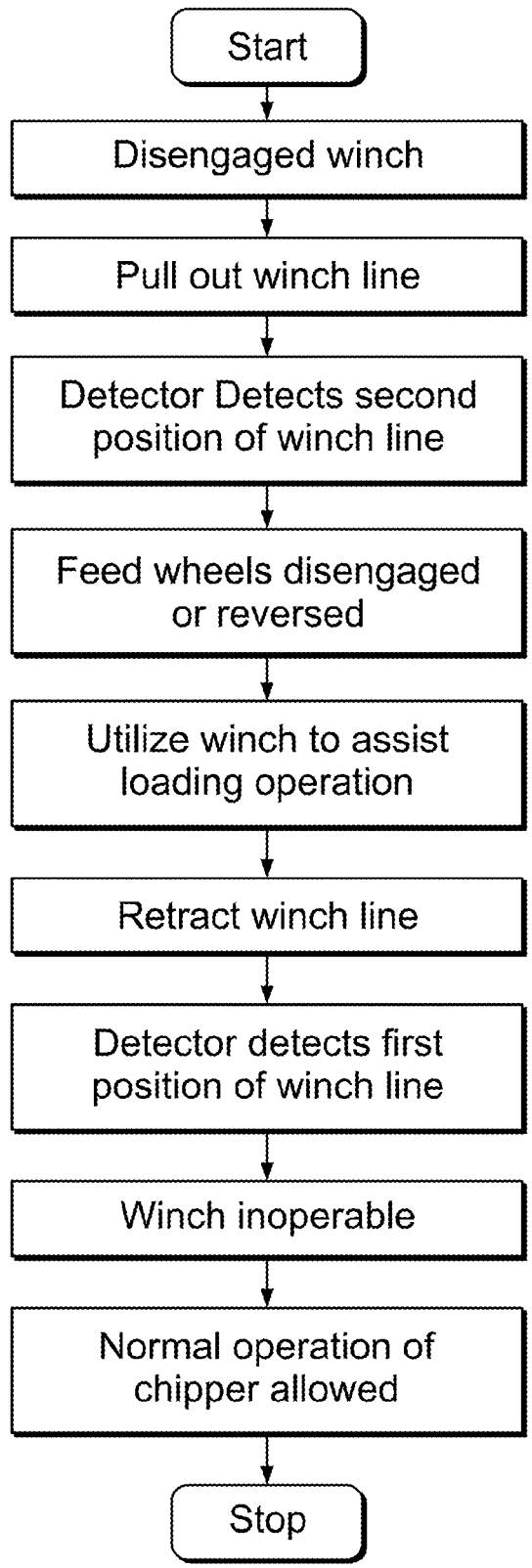
FIG. 10 is a flow chart according to one embodiment of the wood chipper.

During normal operation then, when additional wood material is required, the winch line 54, which is assumed to be in its retracted state (e.g., first position), is extended. This may be accomplished for example by releasing the winch through a winch release such as a lever (not shown). Once line 54 is extended, the detector 60 detects the lack of this first position and/or the second position and either directly or through controller 80 allows operation of (e.g., powers) winch 52 while allowing operation of the at least one feed wheel in a predefined manner. In one embodiment the predefined manner comprises removing power from the feed wheels 26, while an alternate embodiment comprises operating the feed wheels 26 in a reverse direction. Of course, other chipper systems may also be controlled in response thereto (e.g., cutting assembly 30). The winch is then used to pull unprocessed wood products to the wood chipper. When the winch 52 is no longer required, the winch line 54 is retracted, whereby the detector 60 detects that the winch line 54 is retracted (e.g., in the first position) and accordingly, either directly or through controller 80, operation of the winch 52 is prohibited (e.g., removes power therefrom) while normal operation of the feed wheels 26 is allowed (e.g., in a forward direction). FIG. 10 illustrates a flow chart of the above-identified operation of chipper 10 according to one preferred embodiment.

Figure 11:
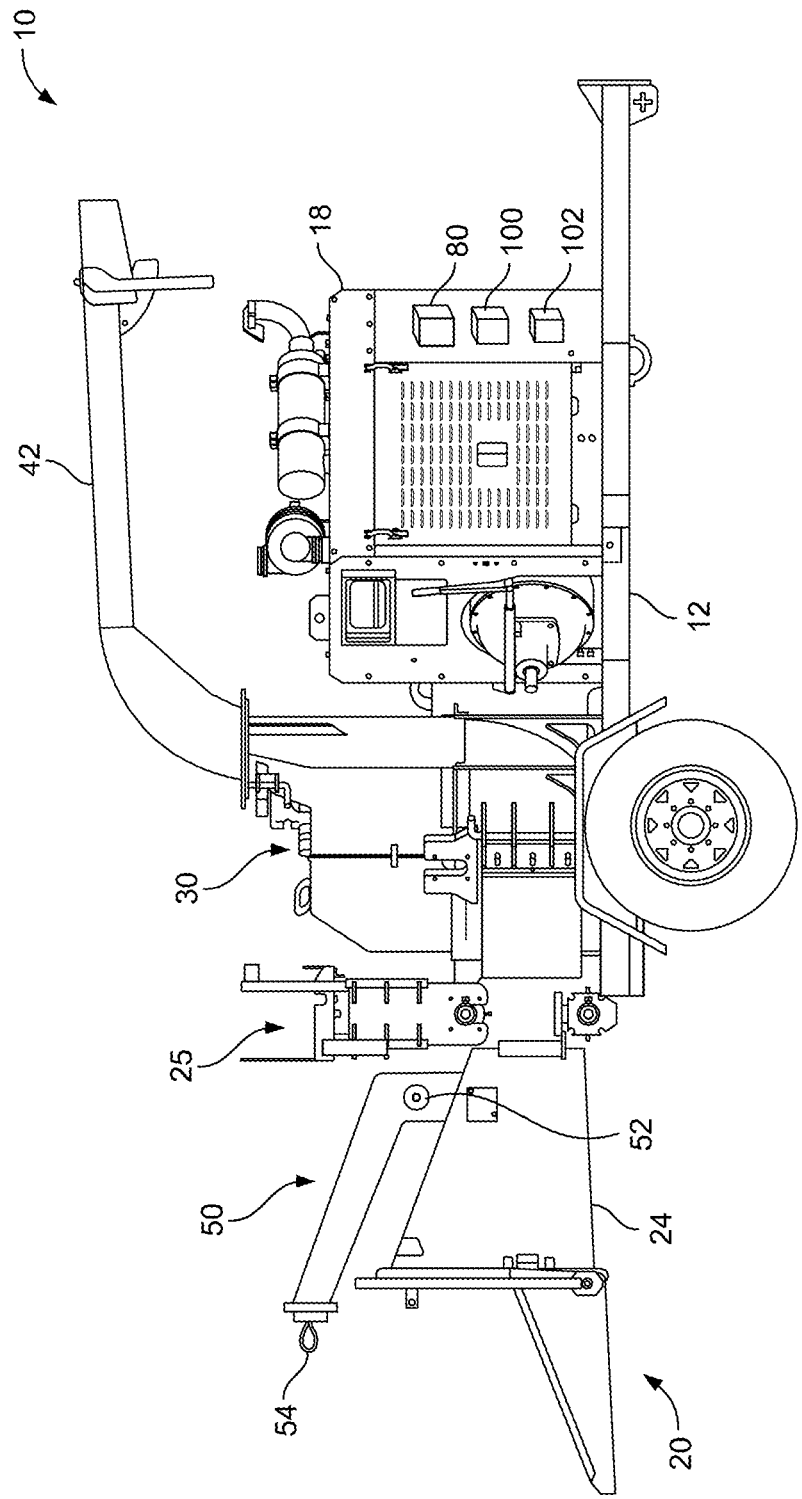
FIG. 11 is a side view of a wood chipper according to yet another embodiment of the present invention.

Yet another embodiment is illustrated in FIG. 11. In this embodiment, the control of the winch 52 and feed wheels 26 is determined by the operative load of chipper 10. For example, by the load on the power system and in one embodiment, more particularly, by the revolutions-per-minute (RPM) of an internal combustion (IC) engine 18 used to power wood chipper 10.

Normal operation of a wood chipper typically requires that its power source operate at a certain level in order to operatively power the various systems of the wood chipper 10. For example, for a wood chipper 10 powered by an IC engine 18, in order to properly power the feed system 25 and the cutting system 30 of a wood chipper 10 during chipping, the engine 18 should be powered or operated at a predetermined and/or threshold RPM. This predetermined level is typically arrived at by determining, under normal operating conditions, the RPM level that the engine 18 requires in order to sustain the feed system 25 and the cutting system 30 at an acceptable level while the wood chipper 10 is in operation and chipping. Below this level performance of the wood chipper 10 may be negatively affected. As such, when the chipper 10 is operated below this first predetermined level, the chipping or reducing of the bulk wood products should not be performed. However, there are times when the chipping operation is not required and at these times it is not always prudent to maintain the engine 18 at the desired first predetermined level. For example only, when the operator is gathering, securing, or otherwise getting ready the unprocessed wood products, it is not always desirable to operate the engine 18 at the first predetermined level. During this period it may be desirable to operate the engine at, for example, a lower engine speed (second predetermined level) thereby reducing the wear on the engine, as well as reducing fuel consumption. For example only and in the illustrated embodiment, this first predetermined, threshold, or desired RPM has been determined to be 2000 RPM of the engine 18, at or above which the chipping operation (i.e., operation of the feed system 25 and the cutting system 30 while feeding bulk wood products to the chipper 10) is acceptable, but below which the chipping operation is not optimally performed or is restricted. However, other systems of chipper 10 can be operated below this first threshold, for example, the winch 52 does not require the engine 18 to be at the first predetermined level and can operate effectively at a reduced or second predetermined level. Again for example only, this may be 1500 RPM.

Further, as described hereinabove, it is not always desirable to allow operation of the winch 52 when the feed system 25 (and/or the cutting system 30) are in operation, as the winch line can become entangled in the feed system 25 (and/or the cutting system 30). As such, the wood chipper 10 in this embodiment is configured to operate the feed system 25 and the cutting system 30, while the winch 52 is made inoperable, when the engine is set to operate (or operates) at (or above) the first predetermined level. However, when the engine is set to operate (or operates) at (or below) the second predetermined level, the feed system 25 and the cutting system 30 are set to operate only in a predetermined manner, while the winch 52 is made operable. For example only, the predetermined operational manner of the feed system 25 and the cutting system 30, when the engine is at (or below) the second predetermined level, may comprise removing power from the systems 25 and 30, or alternatively, operating the feed wheels 26 only in a reverse direction, as described herein-above. Of course, any operational configuration may be so configured.

In this particular embodiment, wherein wood chipper 10 includes an IC engine 18, and infeed assembly 20, a feed system 25, and a cutting system 30, the feed wheel and winch control for the wood chipper 10 comprises a controller or control system 100 which is operatively connected to one or more sensors 102, feed wheels 26, and cutters 32. Sensors 102 are adapted to read, determine, or sense the engine speed of engine 18 and thereby send a signal (S) to controller 100, wherein controller 100, in response to the signal, determines the proper operation of feed wheels 26, and cutters 32. For example. In one embodiment when sensor 102 senses that the speed of engine 18 is at or above a first predetermined level, for example, 2000 RPM, a signal (S1) is sent to controller 100 and the controller allows operation of at least one feed wheel of feed wheel assembly 26 and prohibits operation of winch 52 in response to the engine speed (or signal) being at or above the first predefined level. However, when sensor 102 senses that the speed of engine 18 is at or below a second predetermined level, for example, 1500 RPM, a signal (S2) is sent to controller 100 and the controller allows operation of the winch and allows operation of the at least one feed wheel in a predefined manner in response to the engine speed (or signal) being at or below the second predefined level.

Of course, alternate configurations' are possible and sensor 102 may be designed to sense other loads on the chipper 10 including but not limited to the loads on one or more of the feed system 25 and/or the cutting system 30. Further, single, multiple, or variable events of the power source 18, the feed system 25 and/or the cutting system 30 may also be sensed. As such, sensor 102 may be adapted to read or sense any system or device that is capable of correlation to the load on chipper 10. For example, sensor 102 could be a 2-state sensor, detector, or switch which is configured to send a signal to control 100 upon sensing a first or second state of engine 18, for example, either the first or second predetermined level. Upon sensing one of the states of engine 18, the controller 100 could then be configured to operate the wood chipper 10 in either the first or second predetermined states when the engine is in the first state, and correspondingly configured to operate the wood chipper 10 in either the second or first predetermined states when the sensor is either not in the first state or when in its second state.

During normal operation then, when additional wood material is required, engine 18 is reduced in power. This may be accomplished for example by manually reducing the RPM of the engine. Once the engine is reduced in power, sensor 102 detects the reduced engine speed, and either directly or through controller 100 the operation of winch 52 is allowed while the operation of the at least one feed wheel 26 is only allowed in a predefined manner (e.g., one of not powered or powered in reverse). Of course, other chipper systems may also be controlled in response thereto. Line 54 is then extended, and the winch 52 is used to pull unprocessed wood products to the wood chipper. When the winch 52 is no longer required, the winch line 54 is retracted, and engine 18 is powered up. Sensor 102 then detects the increased engine speed and accordingly, either directly or through controller 100, operation of the winch 52 is prohibited (e.g., removes power therefrom) while normal operation of the feed wheels 26 is allowed (e.g., in a forward direction).

Further yet, operation of chipper 10 may be exclusively through sensor 102, or alternatively, in conjunction with sensor 102 and detector 60, either directly through either one, both, or through controller 100. For example, when sensor 102 and detector 60 are used together and in conjunction with control system 100, the control system 100 may be adapted to allow operation of the at least one feed wheel 26 and prohibit operation of the winch 52 when the first position 62 of the winch line 54 is detected and the engine speed is above a first predefined level (e.g., 2000 RPM), and to allow operation of the winch 52 and allow operation of the at least one feed wheel 26 in a predefined manner when the second position 64 of the winch line 54 is detected and the engine speed is below the second predefined level.

During normal operation of this embodiment then, when additional wood material is required, engine 18 is reduced in power and winch line 54, which is assumed to be in its retracted state (e.g., first position), is extended. This may be accomplished for example by releasing the winch through a winch release such as a lever (not shown) and manually reducing the RPM of the engine. Once line 54 is extended, the detector 60 detects the lack of this first position and/or the second position and sensor 102 detects the reduced engine speed, and either directly or through controller 100 the operation of winch 52 is allowed while the operation of the at least one feed wheel 26 is only allowed in a predefined manner (e.g., one of not powered or powered in reverse). Of course, other chipper systems may also be controlled in response thereto. The winch is then used to pull unprocessed wood products to the wood chipper. When the winch 52 is no longer required, the winch line 54 is retracted, whereby the detector 60 detects that the winch line 54 is retracted (e.g., in the first position) and engine 18 is powered up and sensor 102 detects the increased engine speed. Accordingly, either directly or through controller 100, operation of the winch 52 is prohibited (e.g., removes power therefrom) while normal operation of the feed wheels 26 is allowed (e.g., in a forward direction).

The control system 100 is operatively connected to the feed system 25 and cutting assembly 30 for operation thereby as described herein-above. The controller 100 is also operatively connected to sensor 102 which may comprise any sensor or device that is adapted to at least sense or determine the RPM of engine 18. Control system 100 may also be connected to detector 60 as described herein above.

While sensor 102 may comprise a sensor to sense rpm of the engine 18, other embodiments are of course possible. For example, sensor 102 may comprise an alternator (not shown) of the engine 18, or a magnetic pick-up (not shown) cooperating with the cutting assembly 30 to receive an input signal therefrom. The controller 100 may also be connected to feed system 25 as explained in U.S. Pat. Nos. 6,830,204 and 6,814,320, entitled REVERSING AUTOMATIC FEED WHEEL SYSTEM FOR WOOD CHIPPERS, to Morey et al., the disclosure of which is incorporated herein by reference in their entirety. In this manner the reversing of the feed wheel 26 may be controlled by the automatic feed wheel assembly disclosed therein. It should be appreciated that sensor 102 can be electronic and/or mechanical, and/or adapted to control the mechanical/hydraulic feed system and/or the mechanical/hydraulic cutting system of wood chipper 10. It should also be appreciated that the control system 100 may be used with a feed wheel assembly that is powered hydraulically, electronically, or pneumatically, and/or a cutting system that is powered hydraulically, electronically, or pneumatically.

In operation of the wood chipper 10, the engine rotates the cutting assembly 30 and hydraulically rotates the feed wheels 26. Wood is fed into the infeed assembly 20 by an operator and is contacted by the one or more feed wheels 26. The wood is then fed by the feed wheels 26 to the cutting assembly 30 for reduction by the cutters (not shown), whereby as the cutters rotate and contact the wood, the wood is cut or chipped into wood chips, which move through the discharge assembly 40 and are expelled out of the out the discharge chute 42.

If the engine RPM is determined to be at or above the first threshold (for example 2000 RPM) by sensor 102, a first signal is sent to controller 100 and operation of the feed wheels 26 and cutters or chippers 32 is allowed, while operation of the winch 52 is not allowed. However, if the engine RPM is determined to be at or below the second threshold (for example 1500 RPM) by sensor 102, a second signal is sent to controller 100 and operation of the winch is allowed, while operation of the feed wheels 26 and the cutters or chippers 32 are set to operate only in a predetermined manner. For example only, the predetermined operational manner of the feed wheels 26 and the cutters or chippers 32, when the engine is at (or below) the second predetermined level, may comprise removing power from the systems 25 and 30, or alternatively, operating the feed wheels 26 only in a reverse direction and/or preventing chippers/cutters 32 from operation, as described herein-above. Of course, any operational configuration may be so configured.

As such, when an operator desires to chip or reduce wood products, the RPM of engine 18 is placed at or above the first level. Sensor 102 then signals controller 100 to operate (or allows operation of) the feed wheels 26 in a forward direction, thereby feeding the cutting assembly 30, and operates (or allows operation of) the cutters 32 to operate normally (e.g., rotate at operational speed), while preventing operation of the winch 52. However, when the operator desires to use the winch, for example to assist with loading, the operator places or adjusts the RPM of engine 18 at or below the second level. Sensor 102 then signals controller 100 to operate (or allows operation of) winch 52 and to either: prevent the feed wheels 26 from operating, while operating (or allows operation of) the winch; or operates (or allows operation of) the feed wheels 26 in a reverse direction. In this manner, the feed wheels 26 and winch 52 are automatically coordinated and configured via the engine RPM to prevent the winch line 54 from becoming entangled in the wood chipper 10 during operation thereof, as well as automatically coordinated and configured via the engine RPM to allow operation of the winch 52 and line 54 and either prevent operation of the feed system 25 or alternatively operating feed system 25 in a reverse direction.

Figure 12:
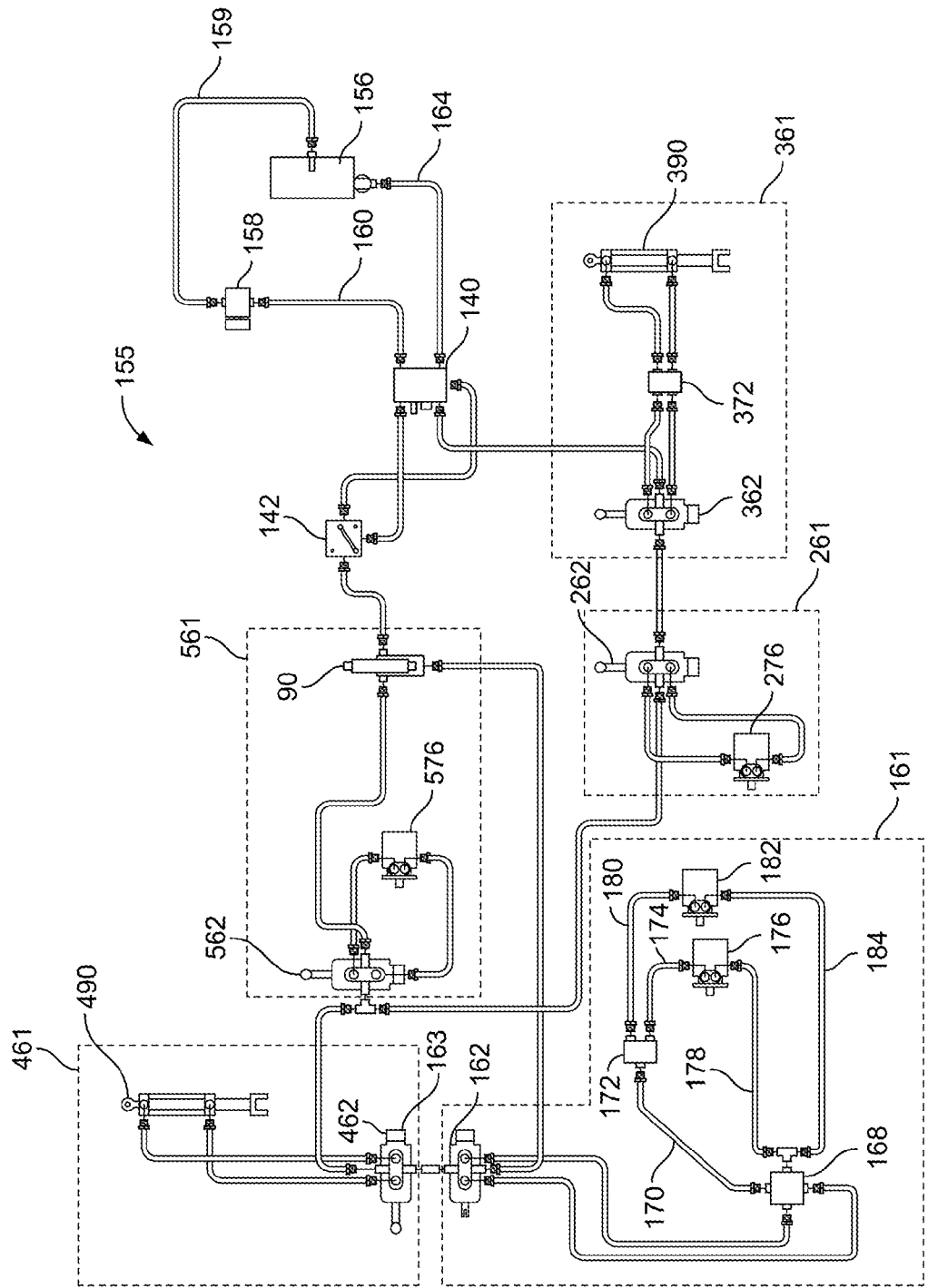
FIG. 12 is a diagrammatical view of a hydraulic control system according to one embodiment of the present invention.

FIG. 12 illustrates one exemplary control system 155 for the operation of the feed wheel assembly 26, cutting assembly 30, and winch 52. In this embodiment, a hydraulic control system 155 is illustrated which controls the rotation of the feed wheels 26. The control system 155 includes a storage tank 156 containing hydraulic fluid having an inlet port and an outlet port thereon. The outlet port of the storage tank 156 is connected to an inlet port of a hydraulic pump 158 by a feed line 159. An outlet port of the hydraulic pump 158 is connected to a fluid supply line 160. A pressure relief mechanism or valve 140 and a variable speed control valve 142 are also operatively disposed within control system 155 as needed. The control system 155 also includes a fluid return line 164 connected to the storage tank 156.

The illustrated control system 155 also includes an auto feed control sub-system 161 operatively disposed to control system 155 comprising, inter alia, a feed or control valve 162 and a reversing auto feed block 168 fluidly connected thereto. Control system 161 further includes a fluid line 170 interposed between and connected to feed block 168 and a flow divider 172. The flow divider 172 outputs to a feed line 174 and top feed wheel motor 176. A return line 178 is also provided. The flow divider 172 also outputs to a feed line 180 and bottom feed wheel motor 182. A return line 184 is also provided.

It should be appreciated that pressurized fluid from the hydraulic pump 158 flows through control system 155, via the supply lines, to the motors 176 and 182 and returns to the storage tank 156, via the return lines; it is also to be appreciated that the flow divider 172 divides the fluid flow between lines 174 and 180; it is to be further appreciated that the feed valve 162 receives fluid via the supply lines, and returns fluid via the return lines, as is known in the art.

The exemplary control system 155 also includes: a discharge control system 261 comprising a swivel discharge control valve 262 and a swivel discharge motor 276 fluidly connected to control system 155 such that discharge chute 42 is movable (e.g., rotatable) via motor 276; a tongue jack control system 361 comprising a tongue jack control valve 362, a tongue jack check valve 372, and a tongue jack cylinder 390 fluidly connected to control system 155 such that the trailer hitch 16 is movable (e.g., raised and lowered) via hydraulic cylinder 390; a yoke lift control system 461 comprising a yoke lift control valve 462 and a yoke lift cylinder 490 fluidly connected to control system 155 such that the one or more feed wheels 26 are movable (e.g., raised and lowered) via Hydraulic cylinder 490; as well as a winch control system 561 comprising a winch control valve 562, a winch motor 576, and switch 90 fluidly connected to control system 155, wherein switch 90 operates as described hereinabove.

Again it should be appreciated that pressurized fluid from the hydraulic pump 158 flows through control system 155, via the supply lines, and to: the discharge control system 261; the tongue jack control system 361; the yoke lift control system 461; and the winch control system 561, and returns to the storage tank 156, via the return lines, as is known in the art.

Figure 13:
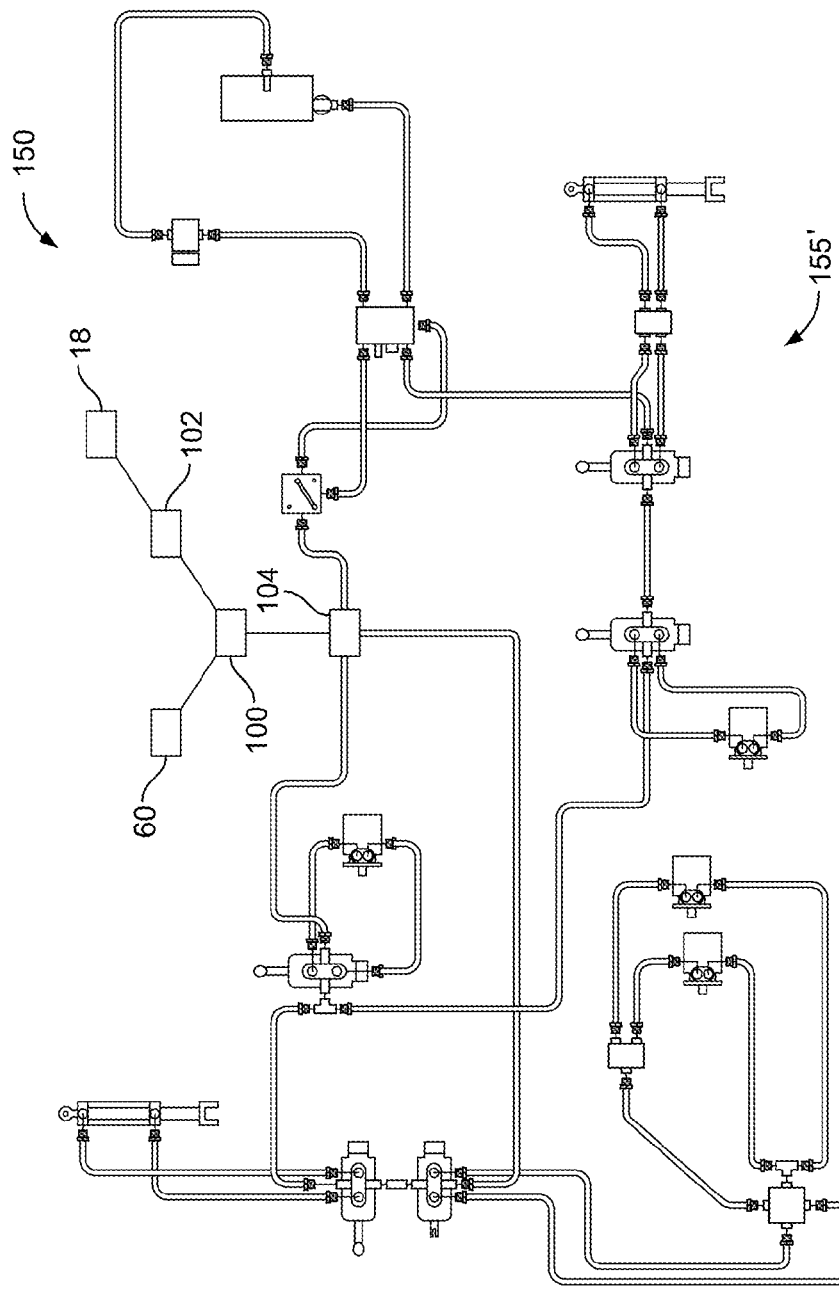
FIG. 13 is a diagrammatical view of a hydraulic control system according to another embodiment of the present invention.

FIG. 13 illustrates another exemplary control system 150 for the operation of the feed wheel assembly 26, cutting assembly 30, and winch 52. In this embodiment, switch 90 is replaced with a valve 104 which is operatively connected to control system 100. Control system 100 is also operatively connected to one or more of the detector 60 and the sensor 102. In this manner, control 100, via valve 104 is operatively connected to hydraulic control system 155'.

Figure 14:
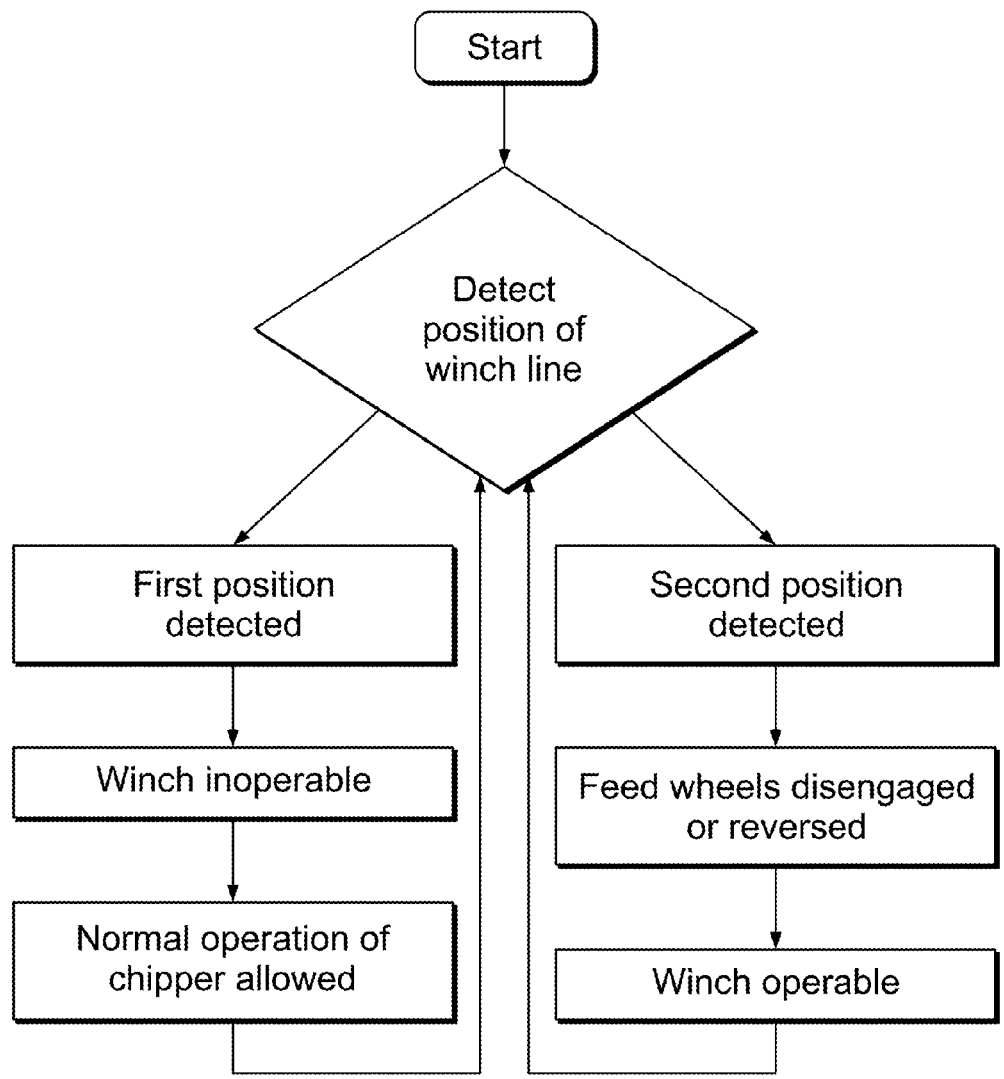
FIG. 14 is a flow chart according to one embodiment of the present invention.

FIG. 14 illustrates one exemplary embodiment of the operational configuration of wood chipper 10 utilizing detector 60 as described hereinabove.

Figure 15:
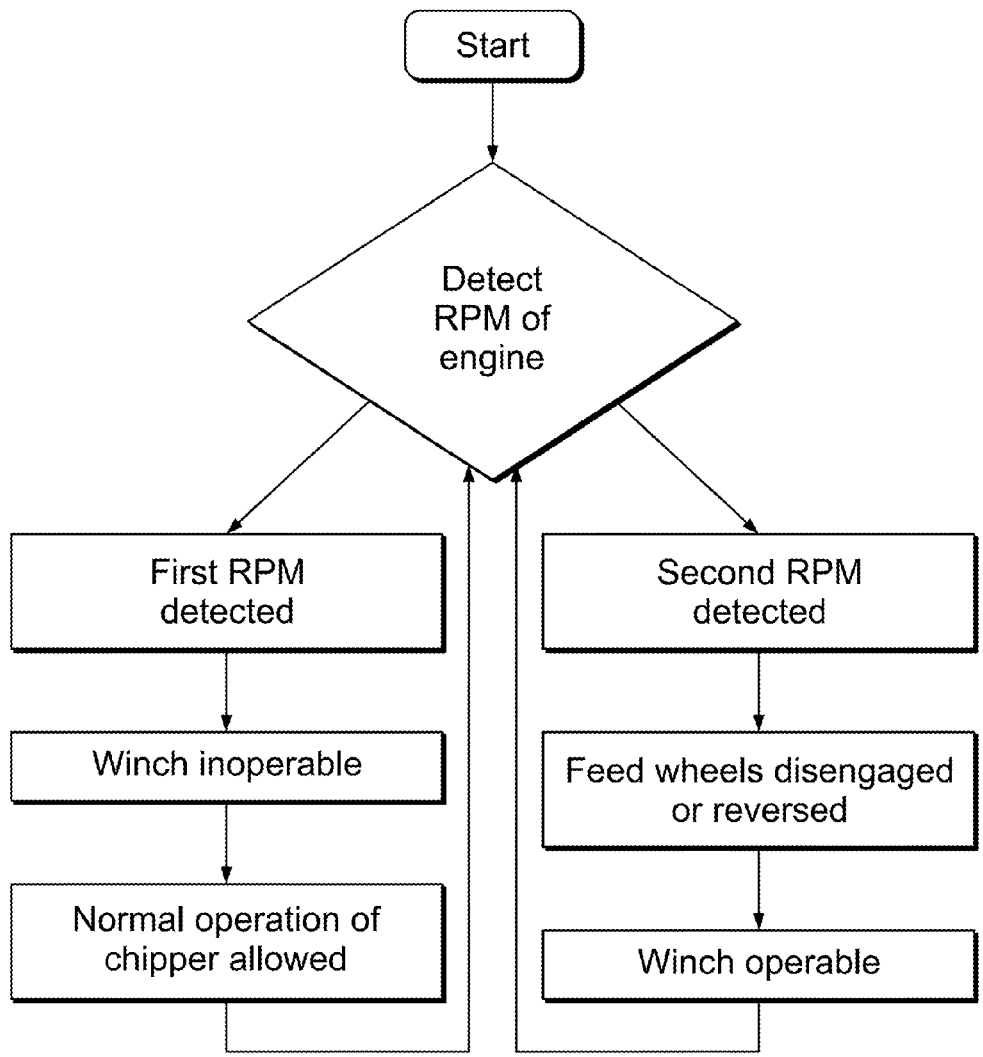
FIG. 15 is a flow chart according to another embodiment of the present invention.

FIG. 15 illustrates one exemplary embodiment of the operational configuration of wood chipper 10 utilizing sensor 102 as described hereinabove.

Figure 16A:
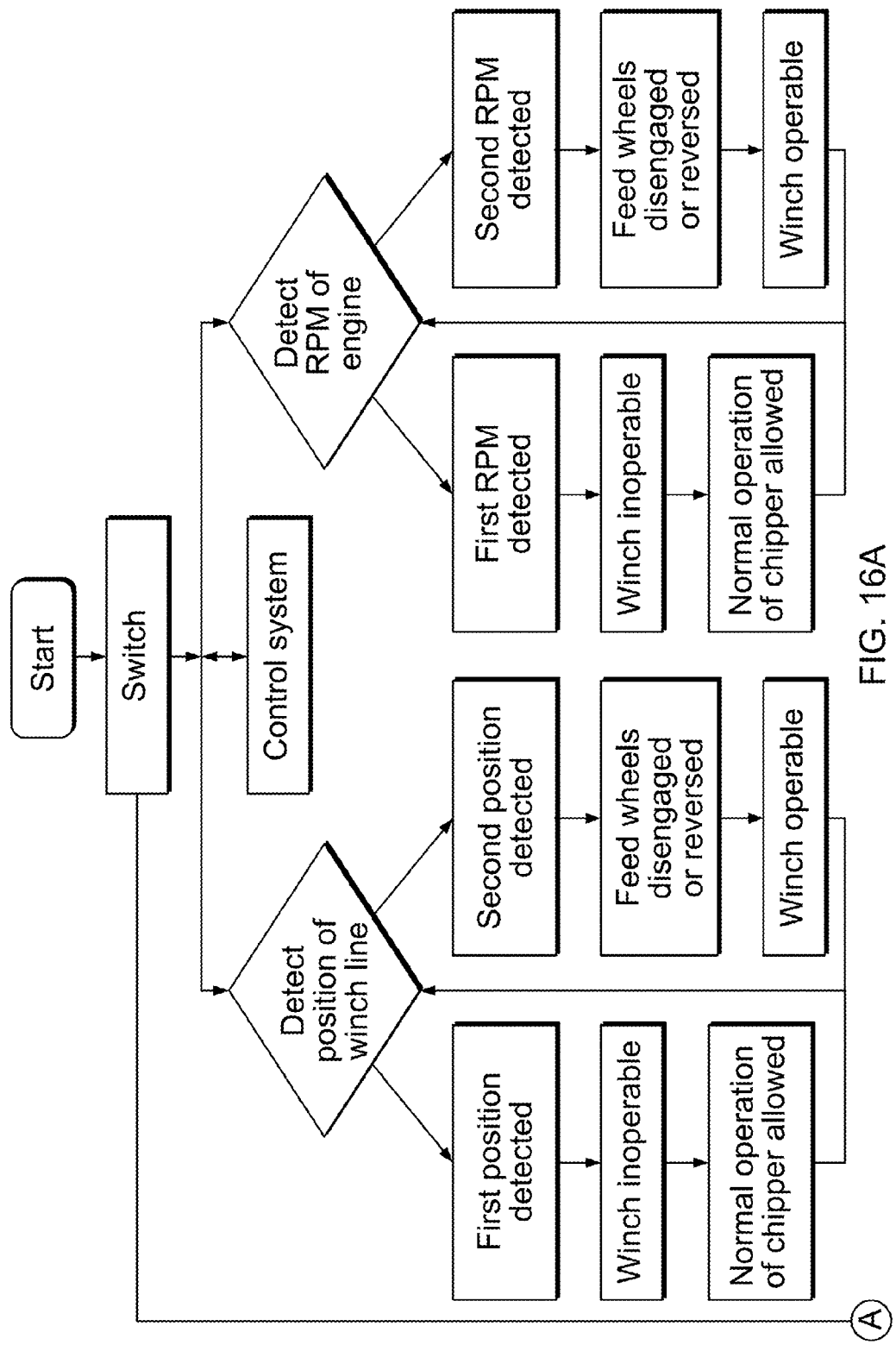
FIG. 16 comprises FIGS. 16A and 16B and is a flow chart of the wood chipper according to yet another embodiment of the present invention.
Figure 16B:
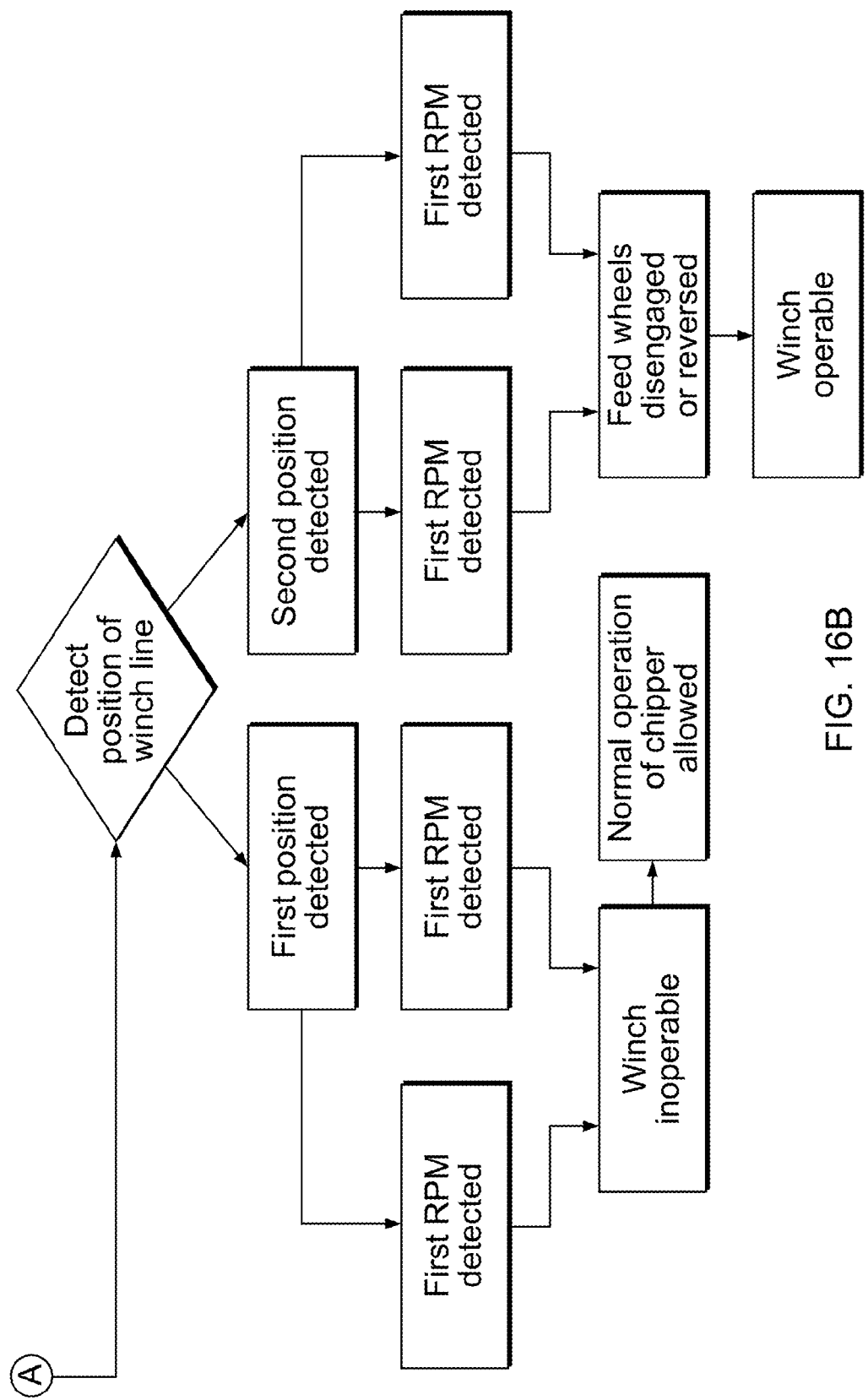

FIG. 16 illustrates one exemplary embodiment of the operational configuration of wood chipper 10 utilizing a configurable or switchable control system 110 that is adapted to operate the chipper utilizing one or more of the detector 60 and the sensor 102 either alone or in combination to control the winch 52 and the feed system 25 via a switch 112. In this embodiment the configurable switch 112 may be either preset or configurable via the operator to control the detector 60 and the sensor 102, either alone or in combination, to control the winch 52 and the feed system 25 as described herein-above.

As described hereinabove, once the winch line is moved from a stored position 62 to an extended or in-use position 64, one or more of the systems 18, 25, and 30 may be turned on, off, or otherwise controlled in response thereto. In yet another embodiment, the system 10 works as described hereinabove except rather than controlling the operation of feed wheels 26, the cutters or chippers 32 are controlled. In this embodiment, operation of the at least one feed wheel 26 is not affected in response to the winch 52 and the operator is free to choose its operational configuration. That is to say that the feed wheels 26 are operated normally and the operator may choose to place the feed wheels 26 in a forward direction, reverse direction, or off. In this manner, the operator is allowed to retain control over the feed system 25, while the winch line 54 is prevented from damage via encountering a rotating cutting head 32.

Figure 17:
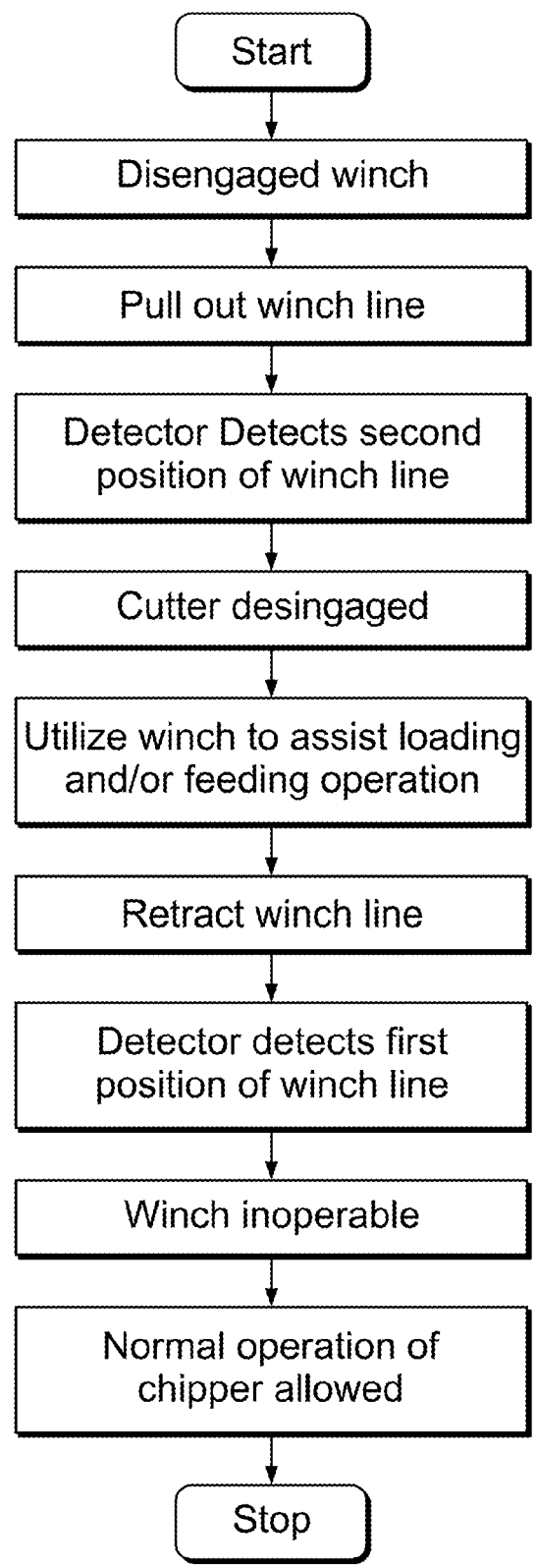
FIG. 17 is a flow chart according to another embodiment of the wood chipper.

During normal operation of this embodiment then, when additional wood material is required, the winch line 54, which is assumed to be in its retracted state (e.g., first position), is extended. Once line 54 is extended, the detector 60 detects the lack of this first position 62 and/or the second position 64 and either directly or through controller 80 allows operation of (e.g., powers) winch 52 and allows normal operation of the at least one feed wheel 26, while operation of cutters 32 is prohibited. Of course, other chipper systems may also be controlled in response thereto (e.g., feed system 25). The winch is then used to pull unprocessed wood products to the wood chipper. When the winch 52 is no longer required, the winch line 54 is retracted, whereby the detector 60 detects that the winch line 54 is retracted (e.g., in the first position 62) and accordingly, either directly or through controller 80, operation of the winch 52 is prohibited (e.g., removes power therefrom) while normal operation of the feed wheels 26 and cutters 32 is allowed. Alternatively, if desired, the cutters 32 could be automatically turned on or powered via the winch line be so positioned. FIG. 17 illustrates a flow chart of the above-identified operation of chipper 10 according to one preferred embodiment.

Figure 18:
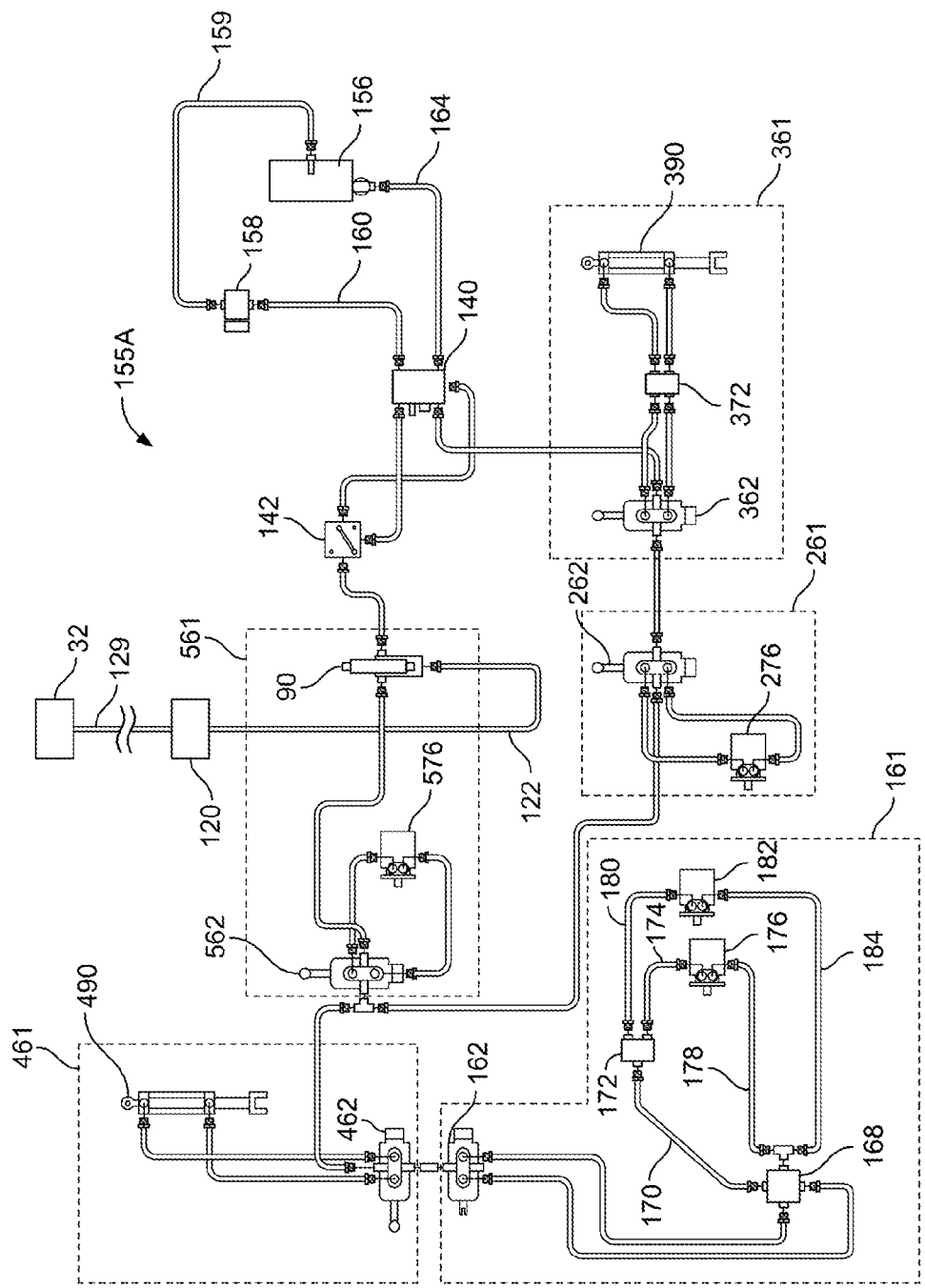
FIG. 18 is a diagrammatical view of a hydraulic control system according to another embodiment of the present invention.

FIG. 18 illustrates one exemplary embodiment comprising a control system 155A for the operation of the feed wheel assembly 26, cutting assembly 30, and winch 52. Control system 155A is similar to control system 155 as described hereinabove except that control system 155A controls the rotation of the cutters 32 in response to detector 60, wherein detector 60 is operatively connected to cutters 32 for control thereof. For example, in one particular embodiment, switch 90 is operatively connected to a clutch 120 via an operative connection 122, wherein clutch 120 controls or powers cutters 32 via an operative connection 124. Clutch 120 may be any known clutch and may be mechanically, hydraulically, or electrically operated and/or switched via one or more connections 122. Further, clutch 120 may operate cutters 32 in any known manner including, inter alia, electrically, mechanically, or hydraulically via one or more connections 124. In one embodiment, engine 18 is connected to cutters 32 via two sets of belts (not shown). The first set of belts connecting the engine 18 to the clutch 120, and the second set connecting the clutch 120 to the cutters 32. The clutch 120 may then be operatively connected to detector 60 (for example, a switch 90) and thereby effectuate control of the cutter 32. Of course, additional control systems, whether electronic, mechanical, and/or hydraulic may also be operatively connected to system 155A for additional control.

Figure 19:
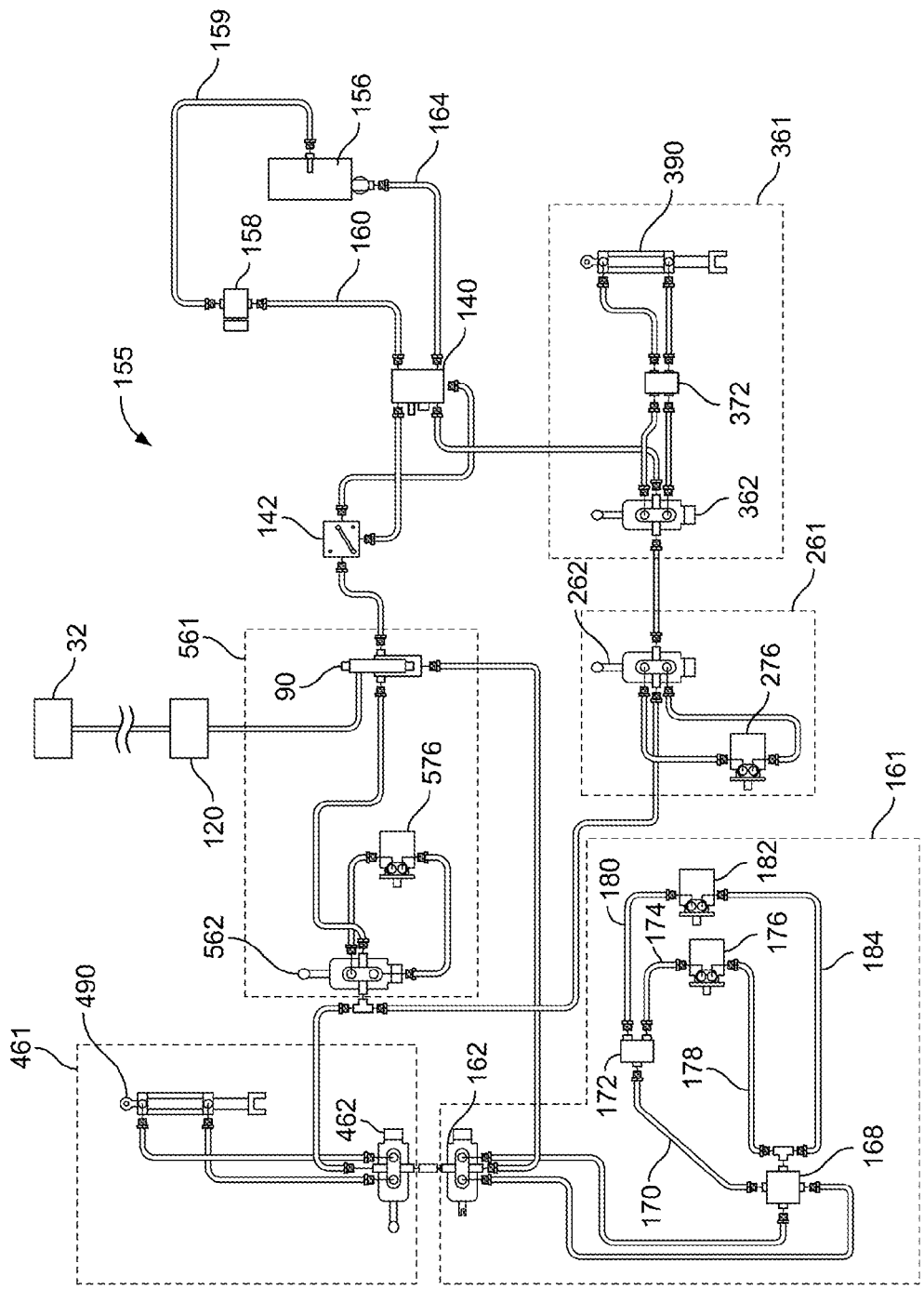
FIG. 19 is a diagrammatical view of a hydraulic control system according to yet another embodiment of the present invention.

Yet another embodiment is illustrated in FIG. 19 which includes control system 155B for control of cutters 32 as described hereinabove, as well as control of the feed wheels 26 in a predefined manner. The predefined manner including operating the feed wheels 26 in a forward or reverse direction, or removing power therefrom. In this manner, both the feed wheels 26 and the cutters 32 may be controlled with respect to the status and/or position of the winch line 54.

During normal operation of this embodiment then, when additional wood material is required, the winch line 54, which is assumed to be in its retracted state (e.g., first position), is extended. Once line 54 is extended, the switch 90 detects the lack of this first position 62 and/or the second position 64 and either directly or through a controller (e.g., controller 80) allows operation of (e.g., powers) winch 52, and either directly via clutch 120 or a controller 80 removes power from cutter 32, while allowing operation of the at least one feed wheel in a predefined manner. In one embodiment the predefined manner comprises removing power from the feed wheels 26, while an alternate embodiment comprises operating the feed wheels 26 in a reverse direction. When the winch 52 is no longer required, the winch line 54 is retracted, whereby the switch 90 detects that the winch line 54 is retracted (e.g., in the first position) and accordingly, either directly or through controller 80, operation of the winch 52 is prohibited (e.g., removes power therefrom), cutters 32 may be automatically turned on and powered up, or alternatively only allowed to be turned on via operator input (e.g., switched or operated normally). Hereto of course, additional control systems, whether electronic, mechanical, and/or hydraulic may also be operatively connected to system 155B for additional control.

Figure 20:
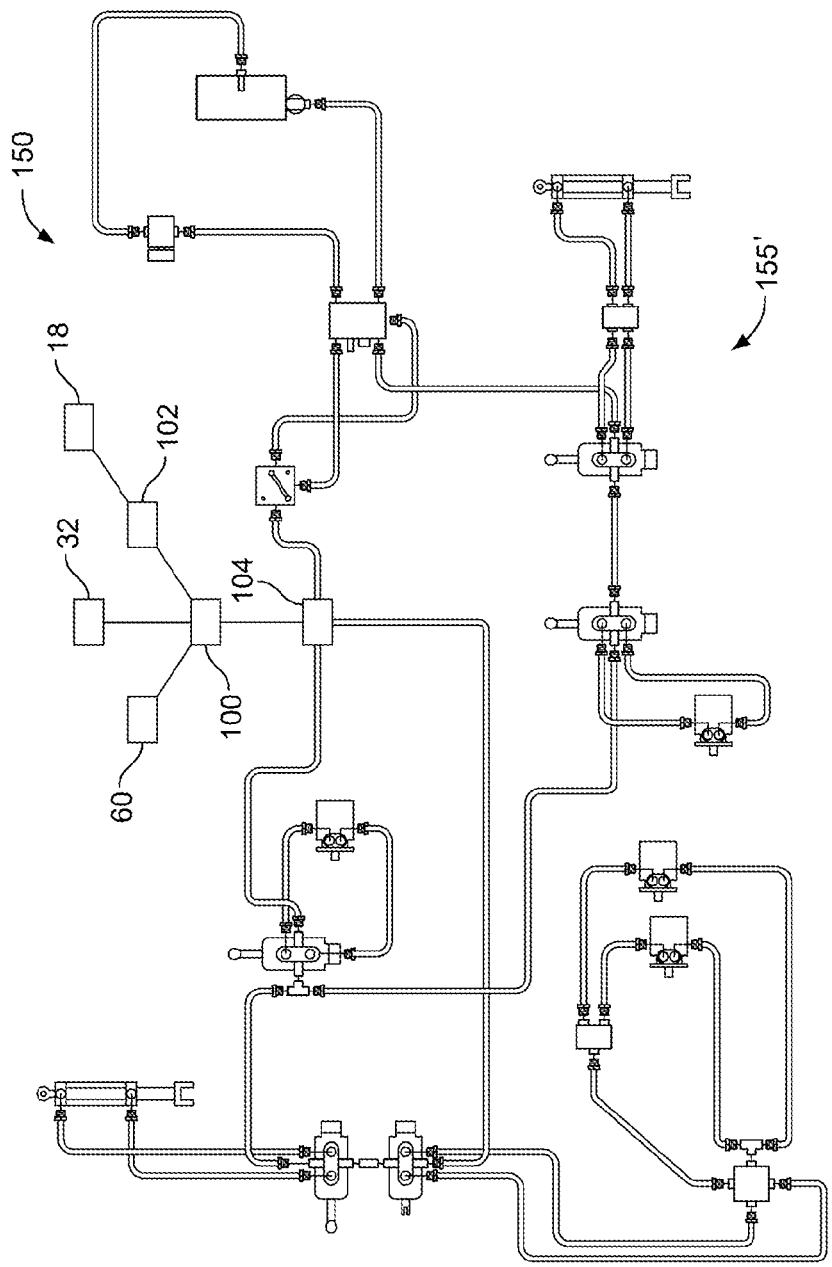
FIG. 20 is a diagrammatical view of a hydraulic control system according to another embodiment of the present invention.

Yet another embodiment is illustrated in FIG. 20. In this embodiment, the control of the winch 52 and cutter 32 is determined by the operative load of chipper 10. For example, by the load on the power system and in one embodiment, more particularly, by the revolutions-per-minute (RPM) of an internal combustion (IC) engine 18 used to power wood chipper 10.

As described hereinabove, normal operation of a wood chipper typically requires that its power source operate at a certain level in order to operatively power the various systems of the wood chipper 10. For example, for a wood chipper 10 powered by an IC engine 18, in order to properly power the feed system 25 and the cutting system 30 of a wood chipper 10 during chipping, the engine 18 should be powered or operated at a predetermined and/or threshold RPM. This predetermined level is typically arrived at by determining, under normal operating conditions, the RPM level that the engine 18 requires in order to sustain the feed system 25 and the cutting system 30 at an acceptable level while the wood chipper 10 is in operation and chipping. Below this level performance of the wood chipper 10 may be negatively affected. As such, when the chipper 10 is operated below this first predetermined level, the chipping or reducing of the bulk wood products should not be performed. However, there are times when the chipping operation is not required and at these times it is not always prudent to maintain the engine 18 at the desired first predetermined level. For example only, when the operator is gathering, securing, or otherwise getting ready the unprocessed wood products, it is not always desirable to operate the engine 18 at the first predetermined level. During this period it may be desirable to operate the engine at, for example, a lower engine speed (second predetermined level) thereby reducing the wear on the engine, as well as reducing fuel consumption. For example only and in the illustrated embodiment, this first predetermined, threshold, or desired RPM has been determined to be 2000 RPM of the engine 18, at or above which the chipping operation (i.e., operation of the feed system 25 and the cutting system 30 while feeding bulk wood products to the chipper 10) is acceptable, but below which the chipping operation is not optimally performed or is restricted. However, other systems of chipper 10 can be operated below this first threshold, for example, the winch 52 does not require the engine 18 to be at the first predetermined level and can operate effectively at a reduced or second predetermined level. Again for example only, this may be 1500 RPM.

Yet another embodiment is illustrated in FIG. 20. In this embodiment, the control of the winch 52 and feed wheels 26 is determined by the operative load of chipper 10. For example, by the load on the power system and in one embodiment, more particularly, by the revolutions.

As such, the wood chipper 10 in this embodiment is configured to operate the feed system 25 and the cutting system 30, while the winch 52 is made inoperable, when the engine is set to operate (or operates) at (or above) the first predetermined level. However, when the engine is set to operate (or operates) at (or below) the second predetermined level, the feed system 25 and the cutting system 30 are set to operate only in a predetermined manner, while the winch 52 is made operable. For example only, the predetermined operational manner of the feed system 25 and the cutting system 30, when the engine is at (or below) the second predetermined level, may comprise removing power from the cutters 32 while allowing normal operation of the feed wheels 26.

In yet another embodiment, the predetermined operational manner of the feed system 25 and the cutting system 30, when the engine is at (or below) the second predetermined level, may comprise removing power from the cutters 32 while operating the feed wheels 26 only in a reverse direction.

In still another embodiment, the predetermined operational manner of the feed system 25 and the cutting system 30, when the engine is at (or below) the second predetermined level, may comprise removing power from the cutters 32 and the feed wheels 26. Of course, any operational configuration may be so configured. In the embodiment illustrated, the controller 100 is operatively connected to cutters 32 and feed wheels 26 and for example only, a clutch 120 may be operatively disposed between controller 100 and cutter 32 for operational control.

During normal operation then, when additional wood material is required, engine 18 is reduced in power. This may be accomplished for example by manually reducing the RPM of the engine. Once the engine is reduced in power, sensor 102 detects the reduced engine speed, and either directly or through controller 100 the operation of winch 52 is allowed while the operation of the at least one feed wheel 26 is only allowed in a predefined manner (e.g., allowed to operate normally, not powered, or powered in reverse) and the operation of cutter 32 is prohibited. Of course, other chipper systems may also be controlled in response thereto. Line 54 is then extended, and the winch 52 is used to pull unprocessed wood products to the wood chipper. When the winch 52 is no longer required, the winch line 54 is retracted, and engine 18 is powered up. Sensor 102 then detects the increased engine speed and accordingly, either directly or through controller 100, operation of the winch 52 is prohibited (e.g., removes power therefrom) while normal operation of the feed wheels 26 and cutter 32 is allowed.

Further yet, operation of chipper 10 may be exclusively through sensor 102, or alternatively, in conjunction with sensor 102 and detector 60, either directly through either one, both, or through controller 100. For example, when sensor 102 and detector 60 are used together and in conjunction with control system 100, the control system 100 may be adapted to allow operation of the at least one feed wheel 26 and cutter 32 while prohibiting operation of the winch 52 when the first position 62 of the winch line 54 is detected and the engine speed is above a first predefined level (e.g., 2000 RPM), and to allow operation of the winch 52, prohibit operation of the cutter 32, and allow operation of the at least one feed wheel 26 in a predefined manner when the second position 64 of the winch line 54 is detected and the engine speed is below the second predefined level.

During normal operation of this embodiment then, when additional wood material is required, engine 18 is reduced in power and winch line 54, which is assumed to be in its retracted state (e.g., first position), is extended. This may be accomplished for example by releasing the winch through a winch release such as a lever (not shown) and manually reducing the RPM of the engine. Once line 54 is extended, the detector 60 detects the lack of this first position and/or the second position and sensor 102 detects the reduced engine speed, and either directly or through controller 100 the operation of winch 52 is allowed, operation of cutter 32 is prohibited, while the operation of the at least one feed wheel 26 is only allowed in a predefined manner (e.g., one of: allowed to operate normally; not allowed to operate; operate in reverse). Of course, other chipper systems may also be controlled in response thereto. The winch is then used to pull unprocessed wood products to the wood chipper. When the winch 52 is no longer required, the winch line 54 is retracted, whereby the detector 60 detects that the winch line 54 is retracted (e.g., in the first position) and engine 18 is powered up and sensor 102 detects the increased engine speed. Accordingly, either directly or through controller 100, operation of the winch 52 is prohibited (e.g., removes power therefrom) while normal operation of the feed wheels 26 and cutter 32 is allowed.

The control system 100 is operatively connected to the feed system 25 and cutting assembly 30 for operation thereby as described herein-above. The controller 100 is also operatively connected to sensor 102 which may comprise any sensor or device that is adapted to at least sense or determine the RPM of engine 18. Control system 100 may also be connected to detector 60 as described herein above. Further, control system 100 may be operatively connected to cutters 32 in any known manner and for example only, via a clutch 120.

Further, as described hereinabove, The controller 100 may also be connected to feed system 25 as explained in U.S. Pat. Nos. 6,830,204 and 6,814,320, entitled REVERSING AUTOMATIC FEED WHEEL SYSTEM FOR WOOD CHIPPERS, to Morey et al., the disclosure of which is incorporated herein by reference in their entirety. In this manner the prohibition of operating cutter 32 can be tied with the reversing of the feed wheel 26 as disclosed therein. It should be appreciated that sensor 102 can be electronic and/or mechanical, and/or adapted to control the mechanical/hydraulic feed system and/or the mechanical/hydraulic cutting system of wood chipper 10. It should also be appreciated that the control system 100 may be used with a feed wheel assembly and cutting assembly 30 that are powered hydraulically, electronically, or pneumatically.

If the engine RPM is determined to be at or above the first threshold (for example 2000 RPM) by sensor 102, a first signal is sent to controller 100 and operation of the feed wheels 26 and cutters or chippers 32 is allowed, while operation of the winch 52 is not allowed. However, if the engine RPM is determined to be at or below the second threshold (for example 1500 RPM) by sensor 102, a second signal is sent to controller 100 and operation of the winch is allowed, while operation of the feed wheels 26 and the cutters or chippers 32 are set to operate only in a predetermined manner. For example only, the predetermined operational manner of the feed wheels 26 and the cutters or chippers 32, when the engine is at (or below) the second predetermined level, may comprise allowing normal operation of the feed wheels 26 while removing power from cutters 32. Of course, any operational configuration may be so configured.

As such, when an operator desires to chip or reduce wood products, the RPM of engine 18 is placed at or above the first level. Sensor 102 then signals controller 100 to operate (or allows operation of) the feed wheels 26 in a forward direction, thereby feeding the cutting assembly 30, and operates (or allows operation of) the cutters 32 to operate normally (e.g., rotate at operational speed), while preventing operation of the winch 52. However, when the operator desires to use the winch, for example to assist with loading, the operator places or adjusts the RPM of engine 18 at or below the second level. Sensor 102 then signals controller 100 to operate (or allows normal operation of) winch 52, prohibits operation of cutter 32, and may: allow normal operation of the feed wheels 26; prevent the feed wheels 26 from operating; or operates (or allows operation of) the feed wheels 26 in a reverse direction. In this manner, the feed wheels 26, cutters 32, and winch 52 are automatically coordinated and configured via the engine RPM to prevent the winch line 54 from becoming entangled in the cutting system 30 during operation thereof.

Figure 21:
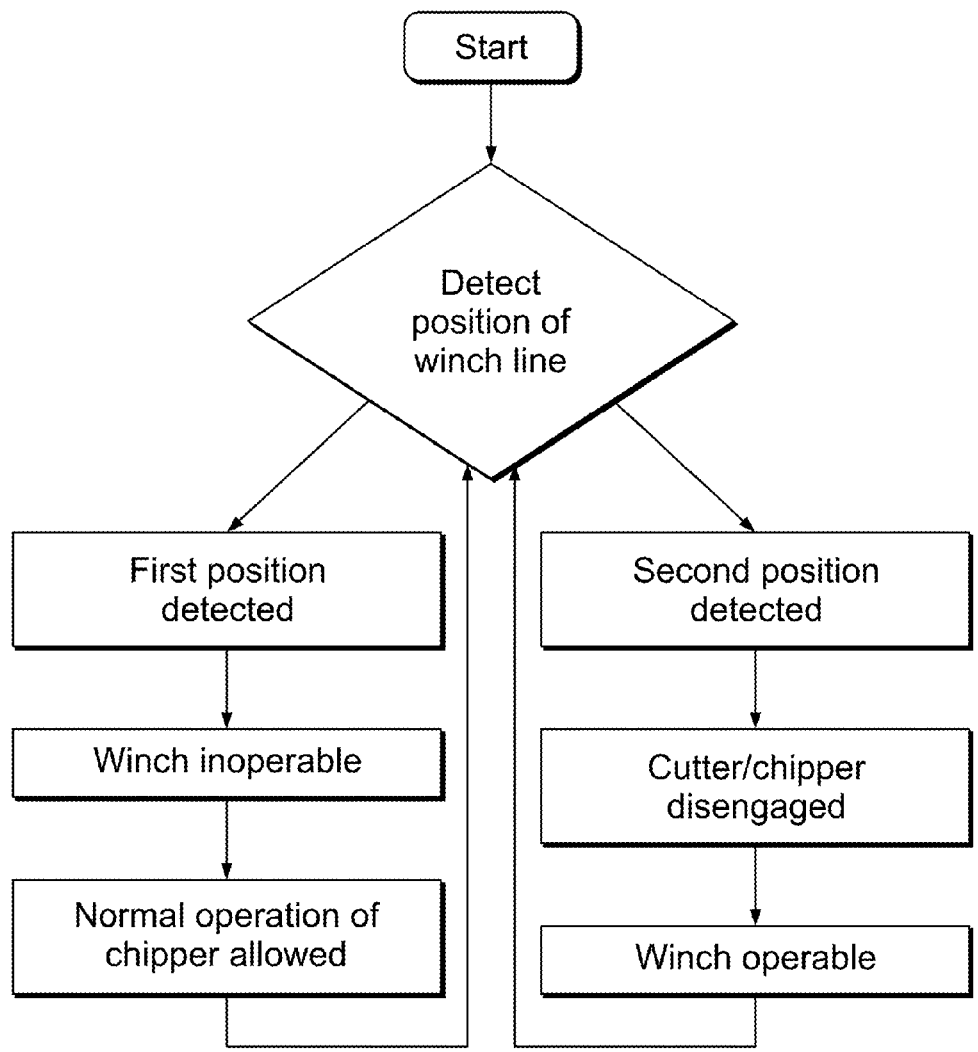
FIG. 21 is a flow chart according to another embodiment of the present invention.
Figure 22:
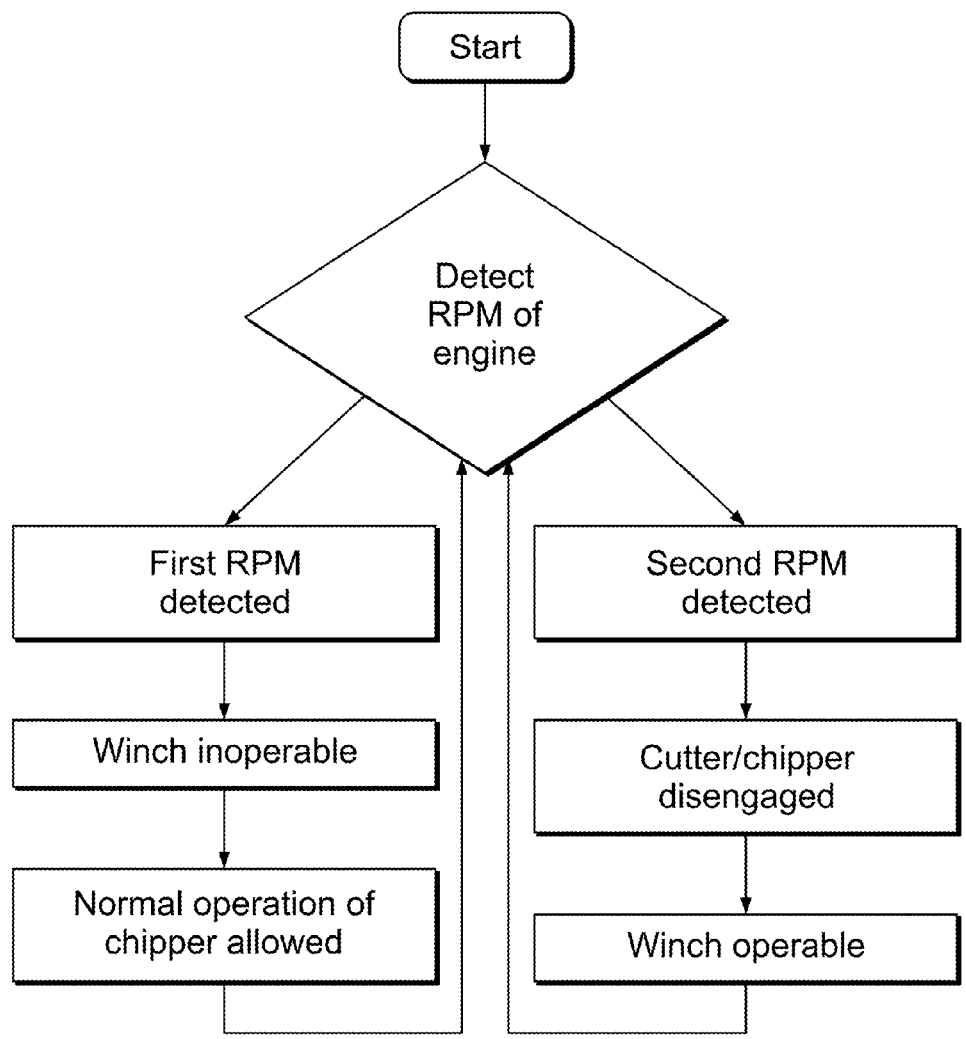
FIG. 22 is a flow chart according to yet another embodiment of the present invention.
Figure 23A:
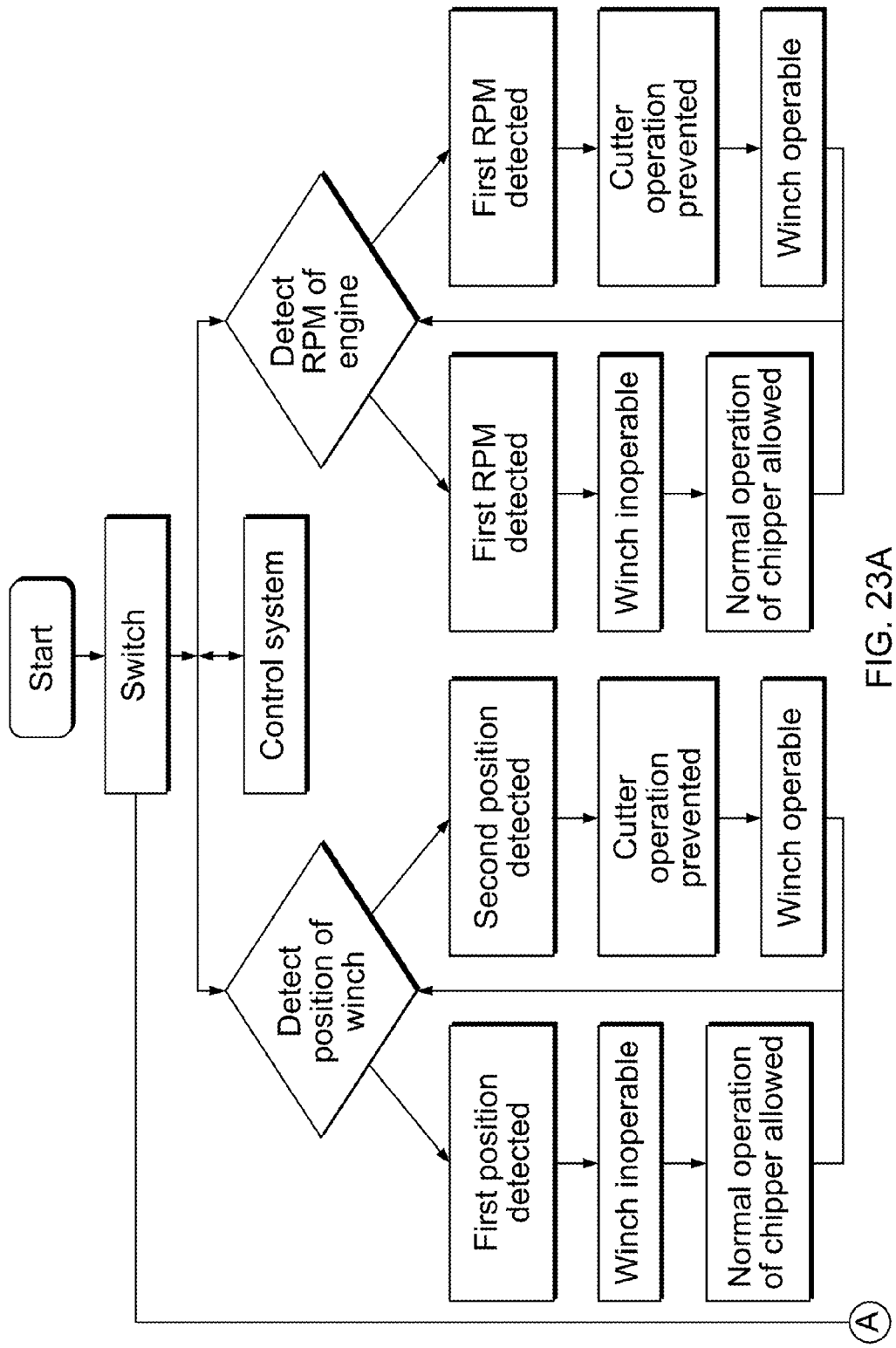
FIG. 23 comprises FIGS. 23A and 23B and is a flow chart of the wood chipper according to still another embodiment of the present invention.
Figure 23B:
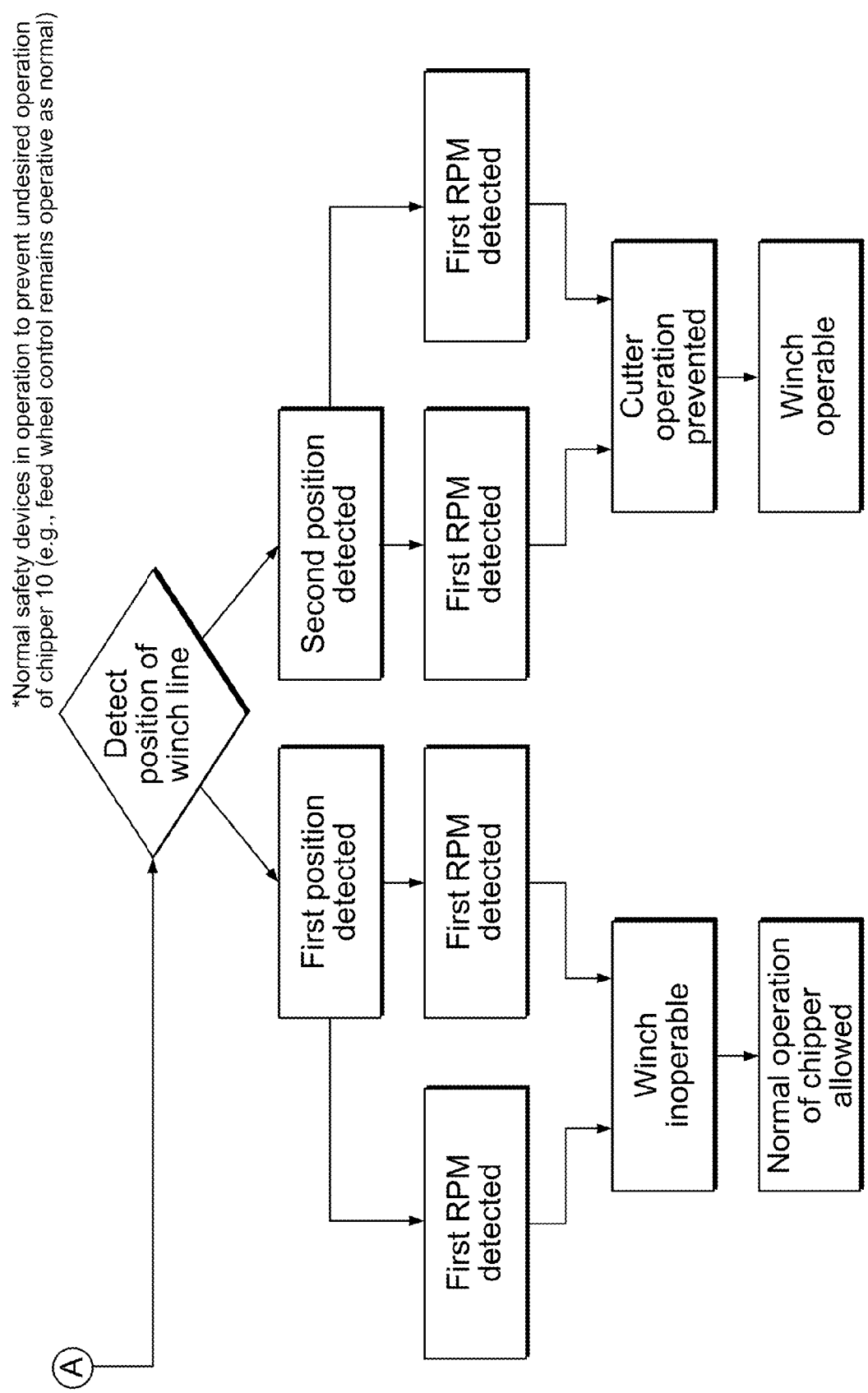

FIG. 21 illustrates one exemplary embodiment of the operational configuration of wood chipper 10 utilizing a detector (e.g., detector 60) as described hereinabove with respect to the operation of cutter 32; FIG. 22 illustrates one exemplary embodiment of the operational configuration of wood chipper 10 utilizing a detector (e.g., sensor 102) as described hereinabove with respect to the operation of cutter 32; and FIG. 23 illustrates one exemplary embodiment of the operational configuration of wood chipper 10 utilizing a configurable or switchable control system 110 that is adapted to operate the chipper utilizing one or more of the detector 60 and the sensor 102 either alone or in combination to control the winch 52 and the cutter 32 via a switch 112. In this embodiment the configurable switch 112 may be either preset or configurable via the operator to control the detector 60 and the sensor 102, either alone or in combination, to control the winch 52 and the cutter 32 as described herein-above.

It is to be understood that the embodiments described herein may be utilized in conjunction with all known safety features of existing chipper systems. For example, and as described herein, while the feed wheels 26 are described as being operable, it is to be understood that the feed wheels 26 are allowed to operate as normal and in conjunction with known safety features, as for example, through the operation of and control by known feed wheel controls and existing safety features. The same is true for all operational systems including, but not limited to, the cutting system 30 and the power system 18. However, it is envisioned that while normal operation of, for example, the feed wheels 26 may require additional safety measures, the cessation of or reversing of the movement of feed wheels 26 may not require these additional features and may therefore, be automatic in response to detector 60 and/or sensor 102. Further, while one preferred embodiment incorporates a pair of opposed, horizontally aligned feed wheels, it is understood that any feed system may be utilized. It should be further understood that this disclosure describes the structure and operation of the disclosed systems with respect to a hydraulic system, however, other powering systems may also be utilized without departing from the scope of this invention.

It is further to be understood that while a linear sequence of events has been described, it should be appreciated that various modifications can be made therein and, as such, the system does not necessarily require a linear sequence of events. It is also to be understood that various modifications may be made to the system, it sequences, methods, orientations, and the like without departing from the inventive concept and that the description contained herein is merely a preferred embodiment and hence, not meant to be limiting unless stated otherwise.

Advantageously, the wood chipper, its system, and methods as described herein have, among other advantages, the ability to reduce or prevent the winch line from becoming entangled within one or more of the infeed and reducing systems of the wood chipper, as well as doing so in a manner that is automatic and therefore does not rely on operator intervention, is easily operable, results in increase productivity, reduces machine downtime and repairs, as well as are cost effective.

The solutions offered by the invention disclosed herein have thus been attained in an economical, practical, and facile manner. To with, a novel wood chipper which prevents the winch line from becoming entangled has been invented. While preferred embodiments and example configurations of the inventions have been herein illustrated, shown, and described, it is to be appreciated that various changes, rearrangements, and modifications may be made therein, without departing from the scope of the invention as defined by the claims. It is intended that the specific embodiments and configurations disclosed herein are illustrative of the preferred and best modes for practicing the invention, and should not be interpreted as limitations on the scope of the invention as defined by the claims, and it is to be appreciated that various changes, rearrangements, and modifications may be made therein, without departing from the scope of the invention as defined by the claims.

The invention claimed is:

1. A method of controlling a wood chipper having a powered cutting system, a powered feed system, and a winch comprising:
providing a detector to detect a first and a second position of a winch line, the detector disposed along an operational path of the winch line;
detecting the first and the second position of the winch line;
controlling operation of one or more of the powered cutting system, the powered feed system, and the winch in response to the detection of at least one of the first and the second position of the winch line;
extending the winch line, thereby moving the winch line to the second position;
detecting the second position of the winch line;
powering the winch;
using the winch to pull unprocessed wood products to the wood chipper;
retracting the winch line, thereby moving the winch line to the first position;
detecting the first position;
removing power from the winch;
operating the wood chipper to process the wood products.

2. The method according to claim 1 wherein the control step comprises:
allowing operation of at least one feed wheel and prohibit operation of the winch when the first position of the winch line is detected, and to allow operation of the winch and allow operation of the at least one feed wheel in a predefined manner when the second position is detected.

3. The method according to claim 1 wherein:
the predefined manner comprises preventing the operation of the at least one feed wheel.

4. The method according to claim 1 wherein:
the predefined manner comprises operating the at least one feed wheel in a reverse direction.

5. The method according to claim 1 wherein the control step comprises:
allowing operation of the cutting system and prohibiting operation of the winch when the first position of the winch line is detected, and to allow operation of the winch and prohibit operation of the cutting system when the second position is detected.

6. A method of controlling a wood chipper having a powered cutting system, a powered feed system, and a winch comprising:
providing a switch to switch between a first and a second position, the switch disposed along an operational path of a winch line of a winch;
providing a collar disposed adjacent the first end of on the winch line, wherein the collar activates the switch to switch from the first and second positions;
whereby when the switch is in the first position, a controller allows operation of at least one of the powered cutting system, the powered feed system, and the winch;
extending the winch line, thereby moving the collar attached thereto, the collar activating the switch to switch to the second position;
using the winch to pull unprocessed wood products to the wood chipper;
retracting the winch line, thereby moving the collar attached thereto, the collar activating the switch to switch to the first position;
operating the wood chipper to process the wood products.

7. The method according to claim 6 wherein:
when the switch is in the first position, the controller allows operation of the powered feed system and prohibits operation of the winch, and when the switch is in the second position, the controller allows operation of the winch and allows operation of the powered feed system in one of a reverse or non-operational condition.

8. The method according to claim 6 further comprising:
providing a control system in communication with the switch, the control system adapted to be operatively connected to the winch and a powered feed system for control thereof.

9. The method according to claim 6 wherein:
when the switch is in the first position, the controller allows operation of the cutting system and prohibits operation of the winch, and when the switch is in the second position, the controller allows operation of the winch and prohibits operation of the cutting system.

10. A method of controlling a winch for a wood chipper having an engine, a powered cutting system, a powered feed system, and a powered winch comprising:
- automatically determining a first position of a winch line;
- allowing operation of the feed system and prohibiting operation of the winch when the first position is determined;
- automatically determining a second position of the winch line; and
- allowing operation of the winch and allowing operation of the feed system in a predefined manner when the second position is determined;
- wherein the determining step includes determining the first position of the winch line via a means for automatically detecting the first position.

11. A method of controlling a winch for a wood chipper having an engine, a powered cutting system, a powered feed system, and a powered winch comprising:
- automatically controlling the powered cutting system via a means for automatically controlling the wood chipper;
- determining a second position of the winch line via a means for automatically detecting a winch line position; and
- allowing operation of the winch and prohibiting operation of the cutting system, via the means for automatically controlling the wood chipper, when the second position is determined.

* * * * *